United States Patent
Chiang et al.

(10) Patent No.: US 11,961,975 B2
(45) Date of Patent: Apr. 16, 2024

(54) LITHIUM METAL ELECTRODES AND BATTERIES THEREOF

(71) Applicants: Massachusetts Institute of Technology, Cambridge, MA (US); Carnegie Mellon University, Pittsburgh, PA (US); 24M Technologies, Inc., Cambridge, MA (US)

(72) Inventors: Yet-Ming Chiang, Weston, MA (US); Venkatasubramanian Viswanathan, Pittsburgh, PA (US); Linsen Li, Malden, MA (US); Vikram Pande, Pittsburgh, PA (US); Dilip Krishnamurthy, Pittsburgh, PA (US); Zeeshan Ahmad, Pittsburgh, PA (US); William Henry Woodford, Cambridge, MA (US)

(73) Assignees: Massachusetts Institute of Technology, Cambridge, MA (US); Carnegie Mellon University, Pittsburgh, PA (US); 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 17/492,952

(22) Filed: Oct. 4, 2021

(65) Prior Publication Data
US 2022/0029207 A1    Jan. 27, 2022

Related U.S. Application Data

(62) Division of application No. 15/480,235, filed on Apr. 5, 2017, now Pat. No. 11,145,909.
(Continued)

(51) Int. Cl.
*H01M 10/42* (2006.01)
*H01M 4/134* (2010.01)
(Continued)

(52) U.S. Cl.
CPC ....... *H01M 10/4235* (2013.01); *H01M 4/134* (2013.01); *H01M 4/382* (2013.01);
(Continued)

(58) Field of Classification Search
CPC ............. H01M 10/052; H01M 10/054; H01M 10/0567; H01M 10/4235;
(Continued)

(56) References Cited

U.S. PATENT DOCUMENTS

| 6,911,280 B1 | 6/2005 | De Jonghe et al. |
| 2007/0065726 A1 | 3/2007 | Yumoto et al. |

(Continued)

FOREIGN PATENT DOCUMENTS

| JP | H06290807 A | 10/1994 |
| JP | H07302617 A | 11/1995 |

(Continued)

OTHER PUBLICATIONS

Office Action issued by the Korean Patent Office dated Feb. 4, 2021 in related Korean Patent Application No. 10-2018-7032079.
(Continued)

*Primary Examiner* — Victoria H Lynch
(74) *Attorney, Agent, or Firm* — Gesmer Updegrove LLP

(57) ABSTRACT

The present disclosure is generally related to separators for use in lithium metal batteries, and associated systems and products. Certain embodiments are related to separators that form or are repaired when an electrode is held at a voltage.
(Continued)

In some embodiments, an electrochemical cell may comprise an electrolyte that comprises a precursor for the separator.

54 Claims, 10 Drawing Sheets

Related U.S. Application Data

(60) Provisional application No. 62/318,470, filed on Apr. 5, 2016.

(51) Int. Cl.
| | | |
|---|---|---|
| *H01M 4/38* | (2006.01) | |
| *H01M 4/58* | (2010.01) | |
| *H01M 10/052* | (2010.01) | |
| *H01M 10/054* | (2010.01) | |
| *H01M 10/0567* | (2010.01) | |
| *H01M 50/403* | (2021.01) | |
| *H01M 50/437* | (2021.01) | |
| *H01M 50/451* | (2021.01) | |
| *H01M 50/46* | (2021.01) | |
| *H01M 50/497* | (2021.01) | |

(52) U.S. Cl.
CPC ....... *H01M 4/5825* (2013.01); *H01M 10/052* (2013.01); *H01M 10/054* (2013.01); *H01M 10/0567* (2013.01); *H01M 50/403* (2021.01); *H01M 50/437* (2021.01); *H01M 50/451* (2021.01); *H01M 50/46* (2021.01); *H01M 50/497* (2021.01); *H01M 4/381* (2013.01); *H01M 2300/0025* (2013.01)

(58) Field of Classification Search
CPC ......... H01M 2300/0025; H01M 4/134; H01M 4/381; H01M 4/382; H01M 4/5825; H01M 50/403; H01M 50/437; H01M 50/451; H01M 50/46; H01M 50/497
See application file for complete search history.

(56) References Cited

U.S. PATENT DOCUMENTS

| | | | |
|---|---|---|---|
| 2015/0236372 A1 | 8/2015 | Yushin et al. | |
| 2016/0344010 A1* | 11/2016 | Zhamu | ................. H01M 10/05 |

FOREIGN PATENT DOCUMENTS

| | | | |
|---|---|---|---|
| JP | 2008171574 A | 7/2008 | |
| JP | 201134798 A | 2/2011 | |
| JP | 2013-525954 A | 10/2011 | |
| JP | 2012113842 A | 6/2012 | |
| WO | 2015044829 A1 | 4/2015 | |

OTHER PUBLICATIONS

Office Action issued by the Chinese Patent Office dated Dec. 28, 2020 in related Chinese Patent Application No. 201780022432.4.
Chinese Search Report issued by the Chinese National Intellectual Property Administration dated Dec. 21, 2020 in Chinese Patent Application No. 201780022432.4.
Office Action issued by the Korean Patent Office dated Jun. 16, 2020 in related Korean Patent Application No. 10-2018-7032079.
Office Action issued by the Japanese Patent Office dated Jan. 23, 2020 in related Japanese Patent Application No. 2018551127.
Office Action issued by the Japanese Patent Office dated Aug. 1, 2019 in related Japanese Patent Application No. 2018551127.
International Search Report and the Written Opinion issued by the International Searching Authority dated Jun. 1, 2017 in related International Application No. PCT/US2017/026227.
Xilin Chen et al: "Effects of cell positive cans and separators on the performance of high-voltage Li-ion batteries", Journal of Power Sources, Elsevier SA, CH, vol. 213, Apr. 2, 2012 (Apr. 2, 2012) pp. 160-168.
Won-Jin Kwak et al: "Understanding the behavior of Li-oxygen cells containing LiI", Journal of Materials Chemistry A: Materials for Energy and Sustainability, vol. 3, No. 16, Mar. 16, 2015 (Mar. 16, 2015), pp. 8855-8864.

* cited by examiner

LITHIUM METAL ELECTRODES AND BATTERIES THEREOF

PRIORITY INFORMATION

This application is a divisional application of U.S. application Ser. No. 15/480,235 filed Apr. 5, 2017, which claims priority to U.S. Provisional Application No. 62/318,470 filed Apr. 5, 2016, the contents of which are incorporated herein by reference.

GOVERNMENT SPONSORSHIP

This invention was made with Government support under Grant No. DE-EE0007810 awarded by the Department of Energy. The Government has certain rights in the invention.

FIELD

The present invention relates generally to systems and methods for forming separators in electrochemical cells and healing defects in separators in electrochemical cells.

BACKGROUND

Lithium metal batteries are a promising technology because of the high specific energy of lithium. However, many lithium metal batteries experience premature failure due to dendrite growth from the anode to the cathode. Separators have been added to lithium metal batteries to arrest dendrite growth, but often use their utility once damaged by growing dendrites.

Accordingly, improved compositions and methods are desirable.

SUMMARY

Methods and articles for formation and healing of separators in electrochemical cells are generally provided. The subject matter of the present invention involves, in some cases, interrelated products, alternative solutions to a particular problem, and/or a plurality of different uses of one or more systems and/or articles.

In one aspect, methods of forming separators in rechargeable electrochemical cells are generally provided. A method may comprise holding a first electrode at a first voltage in a rechargeable electrochemical cell. The electrochemical cell may comprise an electrolyte comprising a precursor for the separator in an amount of less than or equal to 1 mM and greater than or equal to 1 nM. In some embodiments, the first voltage causes the precursor for the separator to react to form a separator positioned between the first electrode and a second electrode.

In another aspect, methods of healing defects in separators in rechargeable electrochemical cells are provided. A method may comprise holding a first electrode at a first voltage in a rechargeable electrochemical cell. The rechargeable electrochemical cell may comprise a separator and an electrolyte comprising a precursor for the separator in an amount of less than or equal to 1 mM and greater than or equal to 1 nM. In some embodiments, the first voltage may cause the precursor for the separator to react to heal a defect in the separator.

Some embodiments are related to rechargeable electrochemical cells. In one embodiment, a rechargeable electrochemical cell comprises a first electrode, a second electrode, and an electrolyte. The electrolyte may comprise a precursor for a separator that has a solubility in the electrolyte of less than or equal to 1 mM and greater than or equal to 1 nM.

In some embodiments, a rechargeable electrochemical cell comprises a first electrode, a second electrode, and an electrolyte. The electrolyte may comprise at least one of a first halide anion and a species that can react to form a first halide anion, and comprises at least one of a second halide anion and a species that can react to form a second halide anion.

In some embodiments, a rechargeable electrochemical cell comprises a first electrode, a second electrode, and a separator. The separator may comprise at least a first layer and a second layer, and the second layer may undergo oxidation at a higher voltage than the first layer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Systems and methods related to the formation and/or the repair of separators in rechargeable electrochemical cells are generally provided. Certain articles and methods relate to forming and/or repairing a separator in a rechargeable electrochemical cell in situ.

In some embodiments, a rechargeable electrochemical cell may lack a separator after assembly but a separator may form during electrochemical cell charging and/or discharging. In some embodiments, a rechargeable electrochemical cell may comprise an ex situ separator upon assembly and an in situ separator may form during electrochemical cell charging and/or discharging. Separators, such as those formed during electrochemical cell charging and/or discharging, may comprise one or more defects that may be repaired by one or more species present in the electrochemical cell.

Certain embodiments relate to rechargeable electrochemical cells that comprise one or more precursors for a separator. The precursor for the separator may be a species that is capable of reacting to form a separator in an electrochemical cell and/or to repair a defect in a separator in an electrochemical cell. The precursor for the separator may, in some embodiments, react to form a separator and/or to repair a defect in a separator when one or more electrodes are held at a voltage in the electrochemical cell. In some embodiments, a precursor for an electrochemical cell may comprise a halide or a species that comprises a halide. In some embodiments, a precursor for a separator may have a relatively low solubility in an electrolyte present in the rechargeable electrochemical cell, and/or may be present at a relatively low concentration in an electrolyte present in the rechargeable electrochemical cell. As used herein, "separator" is given its ordinary meaning in the art. In one set of embodiments it is a solid or gel material that physically separates an anode from a cathode and prevents shorting. A precursor of a separator is a substance which, by itself, is not as effective as a separator but, upon holding one of the electrodes at a set voltage, or cycling the electrode, or other implementation event as described herein, forms a separator.

Figure 1:
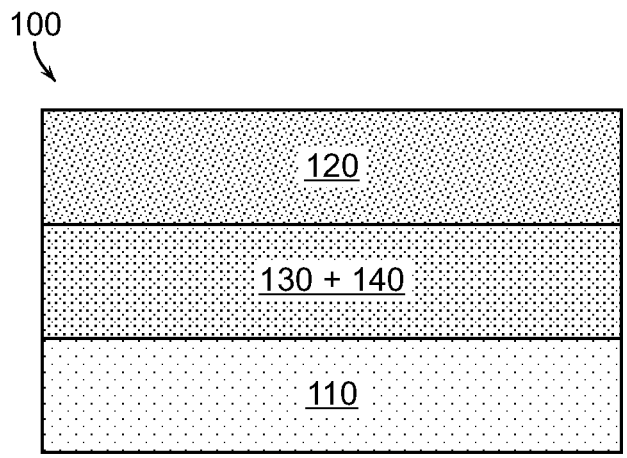
FIG. 1 shows a rechargeable electrochemical cell comprising a first electrode, a second electrode, and an electrolyte comprising a precursor for a separator, according to some embodiments.

As described above, certain embodiments relate to rechargeable electrochemical cells. FIG. 1 shows one non-limiting embodiment of a rechargeable electrochemical cell 100 that comprises first electrode 110, second electrode 120, and electrolyte 130 comprising precursor for a separator 140. Although FIG. 1 shows one precursor for a separator, it should be understood that in some embodiments two, three, four, or more precursors for a separator may also be present in the electrolyte.

In some embodiments, a rechargeable electrochemical cell may comprise a precursor for a separator that may undergo a reaction to form a separator. For example, holding a first electrode at a first voltage in a rechargeable electrochemical cell may result in the formation of a separator. The reaction may be any suitable reaction, such as a redox reaction, a polymerization reaction, and/or crystallization reaction. In some embodiments, a reaction may comprise the crystallization on an electrochemical cell component (e.g., on a first electrode) of a solute dissolved in the electrolyte. The first electrode may be held at the first voltage by any suitable means. In some embodiments, a voltage may be applied to the first electrode, such as, for example, by an external voltage source. In some embodiments, the first voltage may be a voltage that the first electrode inherently has when it is positioned in the rechargeable electrochemical cell. In some embodiments, the first voltage is greater than or equal to 0 V, greater than or equal to 1.5 V, greater than or equal to 2 V, greater than or equal to 2.5 V, greater than or equal to 3 V, greater than or equal to 3.5 V, greater than or equal to 4 V, greater than or equal to 4.5 V, greater than or equal to 5 V, or greater than or equal to 5.5 V. In some embodiments, the first voltage is less than or equal to 6 V, less than or equal to 5.5 V, less than or equal to 5 V, less than or equal to 4.5 V, less than or equal to 4 V, less than or equal to 3.5 V, less than or equal to 3 V, less than or equal to 2.5 V, less than or equal to 2 V, less than or equal to 1.5 V, less than or equal to 1 V, or less than or equal to 0.5 V. Combinations of the above-referenced ranges are also possible (e.g., greater than or equal to 0 V and less than or equal to 6 V). Other ranges are also possible. The first voltage should be understood to be the voltage with respect to a $Li^+/Li$ reference potential.

Figure 2:
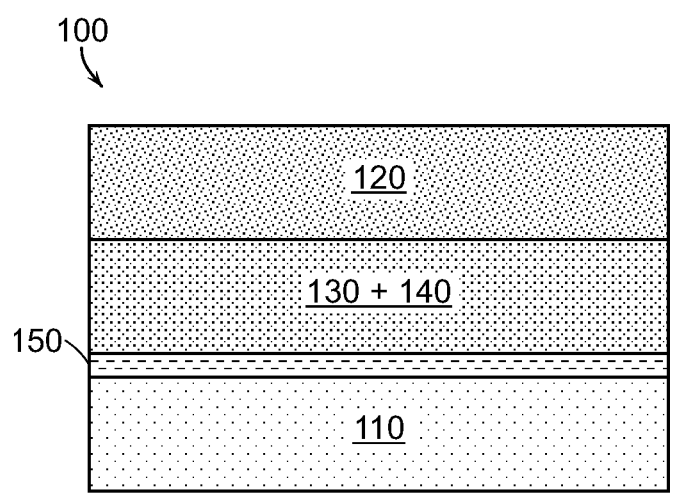
FIG. 2 shows a rechargeable electrochemical cell comprising a first electrode, a second electrode, an electrolyte comprising a precursor for a separator, and a separator, according to some embodiments.

FIG. 2 shows one embodiment in which precursor for a separator 140 undergoes a reaction to form separator 150 in rechargeable electrochemical cell 100. In some embodiments, such as that shown in FIG. 2, the separator may form directly on the first electrode. However, in other embodiments the separator may not form directly on the first electrode. For example, the separator may form on one or more intervening electrochemical cell components (e.g., one or more passivation layers, which will be described further below) disposed on the first electrode. In some embodiments, the separator may form (directly or indirectly) on the first electrode and on one or more of the second electrode, the electrolyte, and an ex situ separator. In some embodiments, one layer of a separator (e.g., a second layer) may form on a first layer (which either formed in situ or ex situ). Other configurations are also possible.

A rechargeable electrochemical cell component referred to as being "disposed on," "disposed between," "on," or "adjacent" another rechargeable electrochemical cell component(s) means that it can be directly disposed on, disposed between, on, or adjacent the rechargeable electrochemical cell component (s), or an intervening rechargeable electrochemical cell component may also be present. A rechargeable electrochemical cell component that is "directly adjacent," "directly on," or "in contact with," another rechargeable electrochemical cell component means that no intervening electrochemical cell component is present. It should also be understood that when a rechargeable electrochemical cell component is referred to as being "disposed on," "disposed between," "on," or "adjacent" another rechargeable electrochemical cell component(s), it may be covered by, on or adjacent the entire rechargeable electrochemical cell component(s) or a part of the rechargeable electrochemical cell component(s).

In some embodiments, a rechargeable electrochemical cell as described herein may initially lack a separator formed in situ, but may form a separator in situ during electrochemical cell cycling. In some embodiments, the separator may form during the first cycle, after greater than or equal to 1 cycle, greater than or equal to 2 cycles, or greater than or equal to 3 cycles. In some embodiments, the separator may form after less than or equal to 4 cycles, less than or equal to 3 cycles, less than or equal to 2 cycles, or less than or equal to 1 cycle. Combinations of the above-referenced ranges are also possible (e.g., during the first cycle and after less than or equal to 4 cycles). Other ranges are also possible. The formation of the separator may be determined by using electron microscopy. Without wishing to be bound by theory, it is believed that the rate of separator formation may be affected by one or more of the following factors: the identity and/or concentration of the precursor, the rate of cycling, the temperature at which cycling occurs, the voltage limits present during cycling, the composition of an electrolyte present during cycling, the identity and/or concentration of additives present during cycling, the electroactive material in the first and/or second electrodes, the identity of conductivity additives in the first and/or second electrode, the identity of a binder in the first and/or second electrodes, and the identity of any current collectors.

Figure 3:
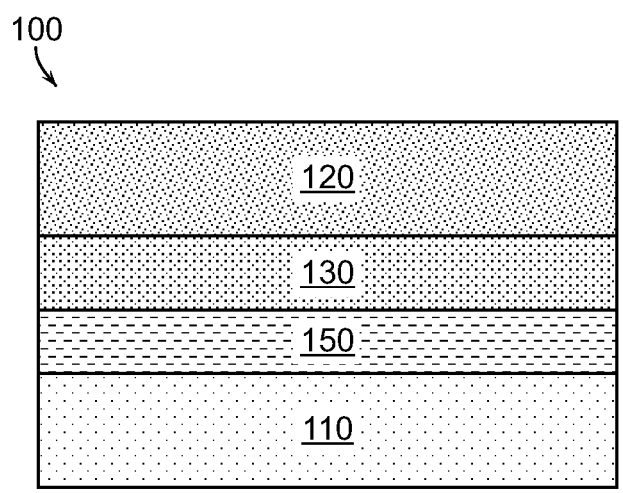
FIG. 3 shows a rechargeable electrochemical cell comprising a first electrode, a second electrode, an electrolyte, and a separator, according to some embodiments.

As described above, certain embodiments relate to electrochemical cells that comprise separators, such as electrochemical cells that comprise separators that are formed in situ. FIG. 3 shows one example of an electrochemical cell that includes a separator, where rechargeable electrochemical cell 100 includes first electrode 110, second electrode 120, electrolyte 130, and separator 150. In some, but not necessarily all, embodiments, the separator is a separator that has formed in situ. The electrolyte may comprise a precursor for a separator, and the precursor for the separator may be a precursor for the separator present in the rechargeable electrochemical cell (i.e., it may be capable of undergoing a reaction to form a separator with substantially the same composition as the separator present in the electrochemical cell), or it may be a precursor for a separator different from the separator present in the rechargeable electrochemical cell (i.e., it may be capable of undergoing a reaction to form a separator with a different composition than the separator present in the rechargeable electrochemical cell). In some embodiments, the rechargeable electrochemical cell comprises an electrolyte that does not include a precursor for a separator.

In some embodiments, such as that shown in FIG. 3, the separator may be directly adjacent the first electrode. However, in other embodiments the separator may not be directly adjacent the first electrode. For example, the separator may be adjacent one or more intervening electrochemical cell components (e.g., one or more passivation layers, which will be described further below) disposed on the first electrode. In some embodiments, the separator may be directly or indirectly adjacent the first electrode and one or more of the second electrode, the electrolyte, and an ex situ separator. Other configurations are also possible.

Figure 4:
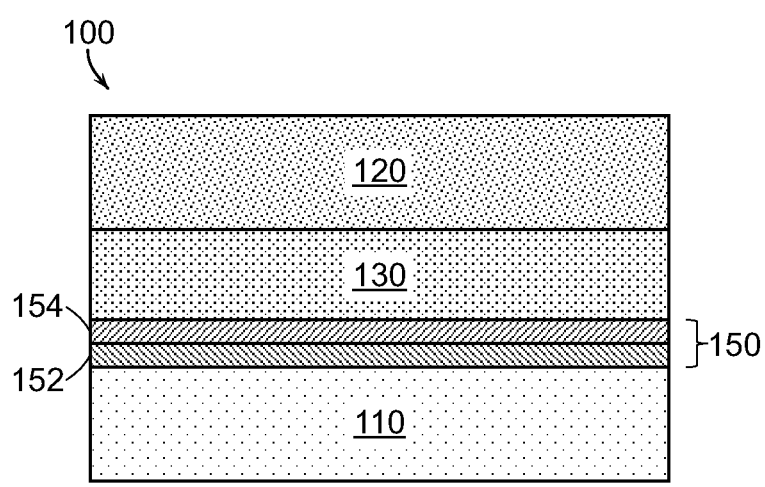
FIG. 4 shows a rechargeable electrochemical cell comprising a first electrode, a second electrode, an electrolyte, and a separator comprising a first layer and a second layer, according to some embodiments.

In some embodiments, a rechargeable electrochemical cell may comprise a separator including more than one layer. FIG. 4 shows one non-limiting embodiment of a rechargeable electrochemical cell which includes a separator with two layers. In FIG. 4, rechargeable electrochemical cell 100 comprises first electrode 110, second electrode 120, electrolyte 130, and separator 150. Separator 150 comprises first layer 152 and second layer 154. In some embodiments, the first layer may be positioned closer to the first electrode than the second layer. The second layer of the separator may have a substantially similar composition to the first layer of the separator, or the two layers may have different compositions. In some cases, the second layer of the separator may undergo oxidation at a higher voltage than the first layer. For example, the separator may include a first layer that comprises LiI (which may make up any suitable wt % of the first layer up to 100 wt %) and a second layer that comprises LiF (which may make up any suitable wt % of the second layer up to 100 wt %). Without wishing to be bound by theory, it may be advantageous for the outermost layer of the separator to be the layer within the separator that undergoes oxidation at the highest voltage because it may result in a separator in which the outermost layer is the layer that is most stable. The stable top layer may prevent erosion and/or destruction of underlying layers that are less stable. It may also be advantageous for the first layer to have a high ion conductivity and/or for the second layer to have a relatively low solubility in the electrolyte (e.g., between 1 nM and 1 mm).

In some embodiments, a precursor for an electrochemical cell may comprise at least a first layer and a second layer, and the second layer may undergoes oxidation at a voltage that is greater than or equal to 3% higher than the voltage at which the first layer undergoes oxidation, a voltage that is greater than or equal to 5% higher than the voltage at which the first layer undergoes oxidation, a voltage that is greater than or equal to 10% higher than the voltage at which the first layer undergoes oxidation, a voltage that is greater than or equal to 15% higher than the voltage at which the first layer undergoes oxidation, a voltage that is greater than or equal to 20% higher than the voltage at which the first layer undergoes oxidation, a voltage that is greater than or equal to 25% higher than the voltage at which the first layer undergoes oxidation, a voltage that is greater than or equal to 30% higher than the voltage at which the first layer undergoes oxidation, a voltage that is greater than or equal to 35% higher than the voltage at which the first layer undergoes oxidation, a voltage that is greater than or equal to 40% higher than the voltage at which the first layer undergoes oxidation, a voltage that is greater than or equal to 45% higher than the voltage at which the first layer undergoes oxidation, or a voltage that is greater than or equal to 50% higher than the voltage at which the first layer undergoes oxidation, or a voltage that is greater than or equal to 55% higher than the voltage at which the first layer undergoes oxidation. In some embodiments, the second layer undergoes oxidation at a voltage that is less than or equal to 60% higher than the voltage at which the first layer undergoes oxidation, a voltage that is less than or equal to 55% higher than the voltage at which the first layer undergoes oxidation, a voltage that is less than or equal to 50% higher than the voltage at which the first layer undergoes oxidation, a voltage that is less than or equal to 45% higher than the voltage at which the first layer undergoes oxidation, a voltage that is less than or equal to 40% higher than the voltage at which the first layer undergoes oxidation, a voltage that is less than or equal to 35% higher than the voltage at which the first layer undergoes oxidation, a voltage that is less than or equal to 30% higher than the voltage at which the first layer undergoes oxidation, a voltage that is less than or equal to 25% higher than the voltage at which the first layer undergoes oxidation, a voltage that is less than or equal to 20% higher than the voltage at which the first layer undergoes oxidation, a voltage that is less than or equal to 15% higher than the voltage at which the first layer undergoes oxidation, a voltage that is less than or equal to 10% higher than the voltage at which the first layer undergoes oxidation, or a voltage that is less than or equal to 5% higher than the voltage at which the first layer undergoes oxidation. Combinations of the above-referenced ranges are also possible (e.g., greater than or equal to 3% higher and less than or equal to 60% higher). Other ranges are also possible. The voltage at which a layer undergoes oxidation may be determined by cyclic voltammetry.

Although FIG. 4 shows a rechargeable electrochemical cell including a separator with only two layers, it should be understood that separators may comprise more than two layers. In some embodiments, a separator comprises greater than or equal to three layers, greater than or equal to four layers, or even more layers. Each layer within the separator may have a substantially similar composition to each other layer in the separator, or one or more layers within the separator may have a different composition than one or more other layers within the separator.

Figure 5A:
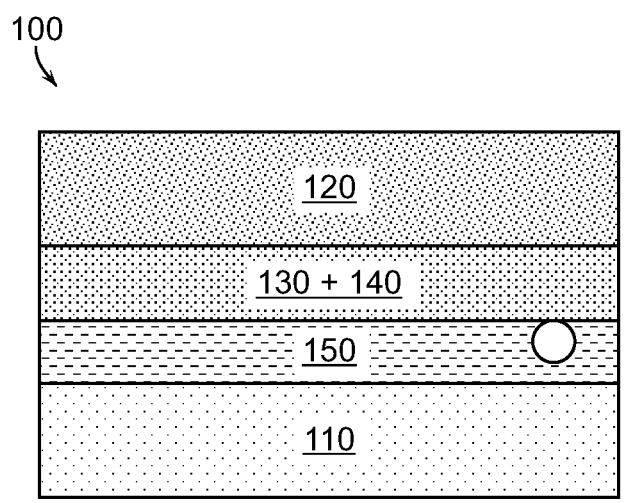
FIG. 5A shows a rechargeable electrochemical cell comprising a first electrode, a second electrode, an electrolyte comprising a precursor for a separator, and a separator comprising a defect, in accordance with some embodiments.
Figure 5B:
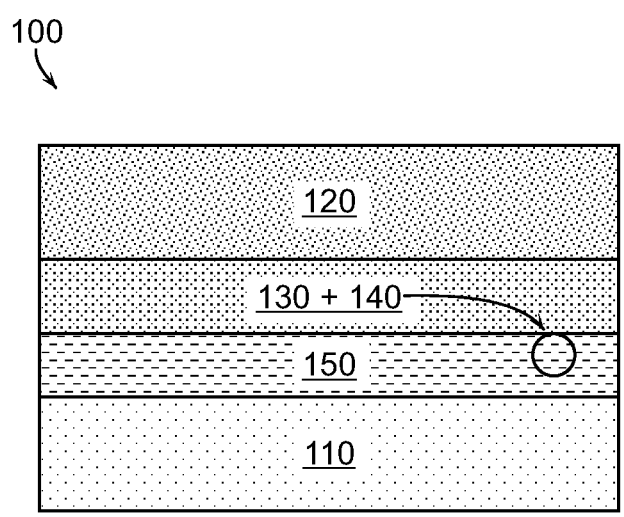
FIG. 5B shows a method for repairing a defect in a rechargeable electrochemical cell, according to some embodiments.

As described above, certain embodiments relate to methods for healing a defect within a separator. The separator may be an in situ separator, or may be an ex situ separator. One example of a method for healing a defect is shown in FIGS. 5A and 5B. FIG. 5A shows rechargeable electrochemical cell comprising first electrode 110, second electrode 120, electrolyte 130 comprising precursor for the separator 140, and separator 150 comprising defect 160. In FIG. 5B, precursor for the separator 140 undergoes a reaction to heal defect 160 so that the separator is no longer damaged, or damaged to a smaller degree. In certain embodiments, one or more defect in the separator may be healed by the formation of a material in the defect with a substantially similar composition to the separator, as is shown in FIG. 5B. In other embodiments, a defect in the separator may be healed by the formation of a material in the defect with a different composition than the separator. Non-limiting examples of defects that may be healed include cracks, pits, pinholes, and the like.

In some embodiments, a defect in a separator may be healed by holding the first electrode at a first voltage. In some embodiments, the a voltage may be applied to the first electrode, such as, for example, by an external voltage source. In some embodiments, the first voltage may be a voltage that the first electrode inherently has when it is positioned in the rechargeable electrochemical cell. In some embodiments, the first voltage is greater than or equal to 0 V, greater than or equal to 1.5 V, greater than or equal to 2 V, greater than or equal to 2.5 V, greater than or equal to 3 V, greater than or equal to 3.5 V, greater than or equal to 4 V, or greater than or equal to 4.5 V. In some embodiments, the first voltage is less than or equal to 5 V, less than or equal to 4.5 V, less than or equal to 4 V, less than or equal to 3.5 V, less than or equal to 3 V, less than or equal to 2.5 V, less than or equal to 2 V, less than or equal to 1.5 V, less than or equal to 1 V, or less than or equal to 0.5 V. Combinations of the above-referenced ranges are also possible (e.g., greater than or equal to 0 V and less than or equal to 5 V). Other ranges are also possible. The first voltage should be understood to be the voltage with respect to a $Li^+/Li$ reference potential.

In some embodiments, a precursor for a separator as described herein may have one or more properties that are beneficial for an electrochemical cell. For instance, a rechargeable electrochemical cell may comprise a precursor for the separator that does not participate in a redox shuttle mechanism when the rechargeable electrochemical cell operates at a potential of greater than or equal to 2.5 V, greater than or equal to 3 V, 3.5 V, greater than or equal to 4 V, greater than or equal to 4.5 V, or greater than or equal to 5 V. Without wishing to be bound by theory, a redox shuttle mechanism is a process that happens in certain electrochemical cells in which a species is oxidized at the cathode, diffuses to the anode, and then is reduced at the anode. This results in an internal short circuit, and decreases the amount of power provided by and the roundtrip efficiency of the rechargeable electrochemical cell.

In some embodiments, a rechargeable electrochemical cell may comprise a precursor for a separator that is relatively insoluble in an electrolyte that is also present in the rechargeable electrochemical cell. The precursor for the separator may have a solubility in the electrolyte of less than or equal to 1 mM, less than or equal to 100 μM, less than or equal to 10 μM, less than or equal to 1 μM, less than or equal to 100 nM, or less than or equal to 10 nM. The precursor for the separator may have a solubility in the electrolyte of greater than or equal to 1 nM, greater than or equal to 10 nM, greater than or equal to 100 nM, greater than or equal to 1 μM, greater than or equal to 10 μM, or greater than or equal to 100 μM. Combinations of the above-referenced ranges are also possible (e.g., greater than or equal to 1 nM and less than or equal to 1 mM). Other ranges are also possible.

In some embodiments, a rechargeable electrochemical cell may comprise a precursor for a separator that is present in an electrolyte that is also present in the rechargeable electrochemical cell at a relatively low concentration. In some embodiments, the precursor for the separator may be present in the electrolyte at a concentration of less than or equal to 1 mM, less than or equal to 100 μM, less than or equal to 10 μM, less than or equal to 1 μM, less than or equal to 100 nM, or less than or equal to 10 nM. The precursor for the separator may be present in the electrolyte at a concentration of greater than or equal to 1 nM, greater than or equal to 10 nM, greater than or equal to 100 nM, greater than or equal to 1 μM, greater than or equal to 10 μM, or greater than or equal to 100 μM. Combinations of the above-referenced ranges are also possible (e.g., greater than or equal to 1 nM and less than or equal to 1 mM). Other ranges are also possible.

In certain embodiments, a precursor for a separator described herein may comprise a species with one or more anions, such as a salt. In some embodiments, the precursor for the separator comprises a salt dissolved in an electrolyte. The precursor for the separator may comprise one or more halide anions, such as one or more of a fluoride anion, a chloride anion, a bromide anion, and an iodide anion. In some embodiments, the precursor for the separator may comprise at least two halide anions, at least three halide anions, or more halide anions. In some embodiments, the precursor for the separator may comprise an anion that comprises one or more halogen atoms, such as a polyhalide anion. When present, the polyhalide anion may comprise only one type of halogen atom (such as, e.g., $O_3^-$, which only comprises iodine) or ma may comprise two or more types of halogen atoms (such as, e.g., $ClBr_2^-$). In some embodiments, the precursor for the separator may comprise a species that may undergo a reaction (e.g., a redox reaction, a chemical reaction) to form a halide anion and/or a polyhalide anion. Non-limiting examples of such species include $LiPF_6$ and $LiBF_4$.

In some embodiments, a precursor for a separator may comprise a species that does not comprise any halogen atoms. For example, the precursor for the separator may comprise a salt dissolved in an electrolyte that comprises an anion that does not include any halogen atoms. Non-limiting examples of such anions include chlorate anions, perchlorate anions, nitrate anions, phosphate anions, bis(fluorosulfonyl) imide anions, and bis(trifluoromethane)sulfonimide anions.

As described above, in some embodiments a precursor for a separator may comprise a salt, such as a salt dissolved in an electrolyte. Non-limiting examples of suitable cations for the salt include alkali metal cations such as lithium and sodium, alkaline earth metal cations such as magnesium, and transition metal cations such as zinc and copper.

In some embodiments, a rechargeable electrochemical cell as described herein may comprise a precursor for a separator that is not a salt or a component of a salt. For example, the rechargeable electrochemical cell may comprise a precursor for a separator that is a halogen with an oxidation state of zero, such as $I_2$.

In some embodiments, a rechargeable electrochemical cell may comprise at least two precursors for a separator, at least three precursors for a separator, or more precursors for a separator. In some embodiments, two or more of the precursors for the separator may be species that are halide anions or can react to form halide anions. For example, an electrochemical cell may comprise at least a first precursor for a separator that is at least one of a first halide anion and a species that can react to form a first halide anion and a second precursor for a separator that is at least one of a second halide anion and a species that can react to form a second halide anion. In some embodiments, the rechargeable electrochemical cell may comprise at least a first precursor for a separator that is at least one of a first halide anion and a species that can react to form a first halide anion and a second precursor for a separator that is not a halide anion or a species that can react to form a halide anion.

As described above, certain embodiments relate to rechargeable electrochemical cells that comprise a separator. The separator may be a solid species that prevents the first electrode from contacting the second electrode, or a species that prevents or significantly retards the formation of a short circuit from the first electrode to the second electrode. In some embodiments, the separator may be a single ion conductor, or may be a solid electrolyte. For example, it may be capable of conducting cations but not anions. In some embodiments, the separator may have a relatively high ionic conductivity. For instance, the ionic conductivity of the separator may be greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to $10^{0}$ S/cm, or greater than or equal to $10^{1}$ S/cm. In some embodiments, the ionic conductivity of the separator may be less than or equal to $10^{2}$ S/cm, less than or equal to $10^{1}$ S/cm, less than or equal to $10^{0}$ S/cm, less than or equal to $10^{-1}$ S/cm, less than or equal to $10^{-2}$ S/cm, or less than or equal to $10^{-3}$ S/cm. Combinations of the above-referenced ranges are also possible (e.g., greater than or equal to $10^{-4}$ S/cm and less than or equal to $10^{2}$ S/cm, greater than or equal to $10^{-4}$ S/cm and less than or equal to $10^{-2}$ S/cm). Other ranges are also possible. The ionic conductivity of the separator may be determined by electrochemical impedance spectroscopy.

In some embodiments, a rechargeable electrochemical cell may comprise a separator with a relatively low area-specific impedance. In some embodiments, the area-specific impedance of the separator may be less than or equal to 100 Ohm*$cm^2$, less than or equal to 50 Ohm*$cm^2$, less than or equal to 20 Ohm*$cm^2$, less than or equal to 10 Ohm*$cm^2$, less than or equal to 5 Ohm*$cm^2$, less than or equal to 2 Ohm*$cm^2$, or less than or equal to 1 Ohm*$cm^2$. In some embodiments, the area-specific impedance of the separator may be greater than or equal to 0.5 Ohm*$cm^2$, greater than or equal to 1 Ohm*$cm^2$, greater than or equal to 2 Ohm*$cm^2$, greater than or equal to 5 Ohm*$cm^2$, greater than or equal to 10 Ohm*$cm^2$, greater than or equal to 20 Ohm*$cm^2$, or greater than or equal to 50 Ohm*$cm^2$. Combinations of the above-referenced ranges are also possible (e.g., greater than or equal to 0.5 Ohm*$cm^2$ and less than or equal to 100 Ohm*$cm^2$, greater than or equal to 0.5 Ohm*$cm^2$ and less than or equal to 20 Ohm*$cm^2$). The area-specific impedance of the separator may be determined by electrochemical impedance spectroscopy.

In some embodiments, a rechargeable electrochemical cell may comprise a separator that is stable at a relatively high voltage. As used herein, a separator is considered to be stable at a voltage if it does not undergo appreciable degradation such as dissolution, cracking, oxidation, and the like, when held at that voltage. In some embodiments, the separator may be stable at a voltage of greater than or equal to 2 V, greater than or equal to 2.5 V, greater than or equal to 3 V, 3.7 V, greater than or equal to 4.0 V, greater than or equal to 4.2 V, greater than or equal to 4.3 V, greater than or equal to 4.5 V, or greater than or equal to 4.7 V. In some embodiments, the separator may be stable at a voltage of less than or equal to 5 V, less than or equal to 4.7 V, less than or equal to 4.5 V, less than or equal to 4.3 V, less than or equal to 4.2 V, less than or equal to 4.0 V, less than or equal to 3.7 V, less than or equal to 3 V, or less than or equal to 2.5 V. Combinations of the above-referenced ranges are also possible (e.g., greater than or equal to 2 V and less than or equal to 5 V, greater than or equal to 3.7 V and less than or equal to 5 V). Other ranges are also possible.

In some embodiments, a rechargeable electrochemical cell may comprise a separator with a relatively high shear modulus. Without wishing to be bound by theory, it is believed that separators that have a high shear modulus may be more resistant to dendrite growth and so may improve the cycle life of the rechargeable electrochemical cell. In some embodiments, the separator has a shear modulus of greater than or equal to 5 GPa, greater 7.5 GPa, greater than or equal to 10 GPa, greater than or equal to 12.5 GPa, greater than or equal to 15 GPa, or greater than or equal to 17.5 GPa. In some embodiments, the separator has a shear modulus of less than or equal to 20 GPa, less than or equal to 17.5 GPa, less than or equal to 15 GPa, less than or equal to 12.5 GPa, less than or equal to 10 GPa, or less than or equal to 5 GPa. Combinations of the above-referenced ranges are also possible (e.g., greater than or equal to 5 GPa and less than or equal to 20 GPa). Other ranges are also possible. The shear modulus of the separator may be determined by pulse echo ultrasonic methods.

In some embodiments, a rechargeable electrochemical cell may comprise a separator with a relatively low linear coefficient of thermal expansion. The linear coefficient of thermal expansion may be less than or equal to 0.0000105 $K^{-1}$, less than or equal to $10^{-5}$ $K^{-1}$, or less than or equal to $10^{-6}K^{-1}$. The linear coefficient of thermal expansion may be determined by thermomechanical analysis.

A separator may have any suitable thickness. In some embodiments, the thickness of the separator is greater than or equal to 1 nm, greater than or equal to 2 nm, greater than or equal to 5 nm, greater than or equal to 10 nm, greater than or equal to 20 nm, greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns, greater than or equal to 10 microns, or greater than or equal to 20 microns. In some embodiments, the thickness of the separator is less than or equal to 50 microns, less than or equal to 20 microns, less than or equal to 10 microns, less than or equal to 5 microns, less than or equal to 2 microns, less than or equal to 1 micron, less than or equal to 500 nm, less than or equal to 200 nm, less than or equal to 100 nm, less than or equal to 50 nm, less than or equal to 20 nm, less than or equal to 10 nm, less than or equal to 5 nm, or less than or equal to 2 nm. Combinations of the above-referenced ranges are also possible (e.g., greater than or equal to 1 nm and less than or equal to 50 microns, or greater than or equal to 10 nm and less than or equal to 1 micron). Other ranges are also possible. The thickness of the separator may be determined by electron microscopy.

The separator may have any suitable morphology and composition. In some embodiments, the separator (or a precursor thereof) has a rock salt crystal structure, a fluorite crystal structure, or an R$\bar{3}$m crystal structure. It should be understood from the discussion above that the separator may comprise any of the precursors for the separator. For instance, the separator may comprise one or more halide anions, one or more polyhalide anions, on more or species that may undergo a reaction to form a halide anion and/or a polyhalide anion, perchlorate anions, chlorate anions, nitrate anions, phosphate anions, alkali metal cations, alkaline earth metal cations, and/or halogen atoms as described above in reference to the precursors for the separator. In some embodiments, the separator may comprise an alkali halide salt that is doped with an alkaline earth cation, such as lithium iodide that is doped with magnesium. Further non-limiting examples of suitable separator materials include LiF, LiCl, LiBr, LiI, $Li_4I_3Br$, $Li_4Br_3I$, $Li_4Br_3Cl$, $Li_4Cl_3Br$, and lithium oxyhalides such as $Li_3OBr$. In some embodiments, one or more lithium oxyhalides may form by abstracting an oxygen from a solvent molecule.

As described above, in certain embodiments a rechargeable electrochemical cell comprises an electrolyte. In some embodiments, the electrolyte is a liquid electrolyte. In some embodiments, the electrolyte may comprise an organic solvent, such as a solvent comprising one or more of an ether group, a nitrile group, a cyanoester group, a fluoroester group, a tetrazole group, a fluorosulfonyl group, a chlorosulfonyl group, a nitro group, a carbonate group, a dicarbonate group, a nitrate group, a fluoroamide group, a dione group, an azole group, and a triazine group. In some embodiments, the electrolyte may comprise an alkyl carbonate, such as ethylene carbonate and/or dimethylene carbonate.

In some embodiments, an electrolyte as described herein may comprise one or more salts to enhance the conductivity of the electrolyte. Non-limiting examples of suitable salts include $LiPF_6$, $LiBF_4$, LiFSI, LiTFSI, $LiClO_4$, LiBOB, and LiDFOB.

In embodiments in which an electrolyte comprises a salt which enhances the conductivity of the electrolyte, the salt which enhances the conductivity of the electrolyte may be present at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, or greater than or equal to 2 M. In some embodiments, the salt which enhances the conductivity of the electrolyte may be present at a concentration of less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 5 M). Other ranges are also possible.

In some embodiments, an electrolyte as described herein may comprise one or more additives that affects the solubility of a precursor for a separator in the electrolyte. For example, the electrolyte may comprise an additive that increases the solubility of a precursor for the separator in the electrolyte. That is, the precursor for the separator may have a higher solubility in the electrolyte in the presence of the additive than in an otherwise equivalent electrolyte that lacks the additive. Non-limiting examples of additives that increase the solubility of the precursor in the electrolyte include water, HF, and $HNO_3$. In some embodiments, the additive may comprise one or more of a nitrile group, a fluorosulfonyl group, a chlorosulfonyl group, a nitro group, a nitrate group, a fluoroamide group, and a dione group.

As described above, certain embodiments relate to rechargeable electrochemical cells. In some embodiments, the rechargeable electrochemical cell comprises at least a first electrode. In some embodiments, the first electrode is an anode. The first electrode may comprise an alkali metal, such as lithium metal, sodium metal, and/or potassium metal. In some embodiments, the first electrode may comprise an alkaline earth metal, such as magnesium and/or calcium. In some embodiments, the first electrode comprises a transition metal (such as yttrium and/or zinc) and/or a post transition metal (such as aluminum).

A first electrode may have any suitable thickness. In some embodiments, the thickness of the first electrode is greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. In some embodiments, the thickness of the first electrode may be less than or equal to 50 microns, less than or equal to 45 microns, less than or equal to 40 microns, less than or equal to 35 microns, less than or equal to 30 microns, less than or equal to 25 microns, or less than or equal to 20 microns. Combinations of the above-referenced ranges are also possible (e.g., greater than or equal to 15 microns and less than or equal to 50 microns). Other ranges are also possible. The thickness of the first electrode may be determined by electron microscopy.

In some embodiments, a surface of a first electrode may be passivated. For instance, a passivation layer may be disposed on the surface of the first electrode. When present, the passivation layer may comprise a precursor for a separator as described above, such as a halide anion. In some embodiments, the passivation layer comprises a polymer, such as poly(2-vinyl pyridine). The passivation layer may be formed by exposing the surface of the first electrode to a composition comprising a species that reacts with the surface of the first electrode to form the passivation layer. For example, the surface of the first electrode may be exposed to a composition comprising a halide salt, such as a lithium halide salt. As another example, a passivation layer may be formed by exposing the surface of the first electrode first to poly(2-vinyl pyridine) and then to iodine vapor.

When present, a passivation layer on a first electrode may have any suitable thickness. In some embodiments, the thickness of the passivation layer on the first electrode is greater than or equal to 1 nm, greater than or equal to 2 nm, greater than or equal to 5 nm, greater than or equal to 10 nm, greater than or equal to 20 nm, greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns, greater than or equal to 10 microns, greater than or equal to 20 microns, or greater than or equal to 50 microns. In some embodiments, the thickness of the passivation layer on the first electrode is less than or equal to 100 microns, less than or equal to 50 microns, less than or equal to 20 microns, less than or equal to 10 microns, less than or equal to 5 microns, less than or equal to 2 microns, less than or equal to 1 micron, less than or equal to 500 nm, less than or equal to 200 nm, less than or equal to 100 nm, less than or equal to 50 nm, less than or equal to 20 nm, less than or equal to 10 nm, less than or equal to 5 nm, or less than or equal to 2 nm. Combinations of the above-referenced ranges are also possible (e.g., greater than or equal to 1 nm and less than or equal to 50 microns, or greater than or equal to 10 nm and less than or equal to 1 micron). The thickness of the passivation layer may be determined by electron microscopy.

As described above, certain embodiments relate to rechargeable electrochemical cells. In some embodiments, the rechargeable electrochemical cell comprises at least a first electrode and a second electrode. In some embodiments, the second electrode is a cathode. The second electrode may comprise one or more of an intercalation compound such as a lithium ion intercalation compound, a conversion compound, an oxide, sulfur, a halide, and a chalcogenide. Non-limiting examples of suitable intercalation compounds include lithium cobalt oxide, lithium iron phosphate, lithium nickel cobalt manganese oxide, and lithium nickel cobalt aluminum oxide. In some embodiments, the rechargeable electrochemical cell is a metal-air cell, such as a lithium-air cell.

A second electrode may store a working ion present in the rechargeable electrochemical cell at any suitable potential. As used herein, a working ion is a species that is formed by oxidation of a metal species at the anode and intercalates into the cathode to provide electrical neutrality to the cathode when the cathode active species is reduced. In some embodiments, the second electrode stores the working ion at a voltage of greater than or equal to 2.0 V, greater than or equal to 2.5 V, greater than or equal to 3.0 V, greater than or equal to 3.5 V, greater than or equal to 4.0 V, or greater than or equal to 4.5 V. In some embodiments, the second electrode stores the working ion at a voltage of less than or equal to 5.0 V, less than or equal to 4.5 V, less than or equal to 4.0 V, less than or equal to 3.5 V, less than or equal to 3.0 V, or less than or equal to 2.5 V. Combinations of the above-referenced ranges are also possible (e.g., greater than or equal to 2.5 V and less than or equal to 5 V). Other ranges are also possible. The voltage at which the working ion is stored may be determined by cyclic voltammetry.

In some embodiments, a rechargeable electrochemical cell may comprise a second electrode with a thickness of greater than or equal to 20 microns, greater than or equal to 50 microns, greater than or equal to 100 microns, or greater than or equal to 200 microns. In some embodiments, a rechargeable electrochemical cell may comprise a second electrode with a thickness of less than or equal to 500 microns, less than or equal to 200 microns, less than or equal to 100 microns, or less than or equal to 50 microns. Combinations of the above-referenced ranges are also possible (e.g., greater than or equal to 20 microns and less than or equal to 50 microns). Other ranges are also possible. The thickness of the second electrode may be determined by electron microscopy.

In some embodiments, the first electrode and/or the second electrode may be disposed on a current collector. The current collector may be in electrical communication with the electrode disposed on it, and may be capable of transmitting electrons from the electrode to an external component (e.g., a load). Non-limiting examples of suitable current collectors include copper, nickel, aluminum, titanium, chrome, graphite, and glassy carbon. The current collector may be in the form of a foil, a mesh, and/or a foam.

In some embodiments, a rechargeable electrochemical cell may comprise one or more ex situ separator(s), or a separator(s) that are added to the cell during the cell assembly process. The ex situ separator(s) may have any suitable composition and structure. Non-limiting examples of suitable ex situ separators include porous materials, such as porous polymer membranes (e.g., cellulosic membranes), porous ceramic membranes, fiber mats (e.g., glass fiber mats), woven structures, and/or non-woven structures. In some embodiments, one or more ex situ separators present in a rechargeable electrochemical cell may comprise a coating. When more than one ex situ separator is present, each ex situ separator may independently have any, all, or none of the properties described herein.

In some embodiments, a rechargeable electrochemical cell as described herein may have one or more advantageous properties, such as being free from dendrites after cycling. In some embodiments, the electrochemical cell may be free from dendrites after greater than or equal to 50 cycles, greater than or equal to 100 cycles, greater than or equal to 200 cycles, greater than or equal to 500 cycles, greater than or equal to 1000 cycles, or greater than or equal to 3000 cycles. In some embodiments, the electrochemical cell may be free from dendrites after less than or equal to 5000 cycles, less than or equal to 3000 cycles, less than or equal to 1000 cycles, less than or equal to 500 cycles, less than or equal to 200 cycles, or less than or equal to 200 cycles. Combinations of the above-referenced ranges are also possible (e.g., greater than or equal to 50 cycles and less than or equal to 5000 cycles). Other ranges are also possible.

In some embodiments, a rechargeable electrochemical cell may have a relatively high area capacity. The area capacity of the rechargeable electrochemical cell may be greater than or equal to 2 mAh/cm$^2$, greater than or equal to 3 mAh/cm$^2$, greater than or equal to 4 mAh/cm$^2$, greater than or equal to 5 mAh/cm$^2$, greater than or equal to 6 mAh/cm$^2$, greater than or equal to 7 mAh/cm$^2$, greater than or equal to 8 mAh/cm$^2$, greater than or equal to 9 mAh/cm$^2$, greater than or equal to 10 mAh/cm$^2$, greater than or equal to 11 mAh/cm$^2$, greater than or equal to 12 mAh/cm$^2$, greater than or equal to 13 mAh/cm$^2$, greater than or equal to 14 mAh/cm$^2$, greater than or equal to 15 mAh/cm$^2$, greater than or equal to 16 mAh/cm$^2$, greater than or equal to 17 mAh/cm$^2$, greater than or equal to 18 mAh/cm$^2$, or greater than or equal to 19 mAh/cm$^2$. The area capacity of the rechargeable electrochemical cell may be less than or equal to 20 mAh/cm$^2$, less than or equal to 19 mAh/cm$^2$, less than or equal to 18 mAh/cm$^2$, less than or equal to 17 mAh/cm$^2$, less than or equal to 16 mAh/cm$^2$, less than or equal to 15 mAh/cm$^2$, less than or equal to 14 mAh/cm$^2$, less than or equal to 13 mAh/cm$^2$, less than or equal to 12 mAh/cm$^2$, less than or equal to 11 mAh/cm$^2$, less than or equal to 10 mAh/cm$^2$, less than or equal to 9 mAh/cm$^2$, less than or equal to 8 mAh/cm$^2$, less than or equal to 7 mAh/cm$^2$, less than or equal to 6 mAh/cm$^2$, less than or equal to 5 mAh/cm$^2$, less than or equal to 4 mAh/cm$^2$, or less than or equal to 3 mAh/cm$^2$. Combinations of the above-referenced ranges are also possible (e.g., greater than or equal to 2 mAh/cm$^2$ and less than or equal to 20 mAh/cm$^2$, or greater than or equal to 3 mAh/cm² and less than or equal to 10 mAh/cm²). Other ranges are also possible.

In some embodiments, a rechargeable electrochemical cell may have a relatively large cycle life. The cycle life of the rechargeable electrochemical cell may be greater than or equal to 50 cycles, greater than or equal to 100 cycles, greater than or equal to 200 cycles, greater than or equal to 500 cycles, greater than or equal to 1000 cycles, or greater than or equal to 3000 cycles. The cycle life of the rechargeable electrochemical cell may be less than or equal to 5000 cycles, less than or equal to 3000 cycles, less than or equal to 1000 cycles, less than or equal to 500 cycles, less than or equal to 200 cycles, or less than or equal to 100 cycles. Combinations of the above-referenced ranges are also possible (e.g., greater than or equal to 50 cycles and less than or equal to 5000 cycles). Other ranges are also possible.

In some embodiments, a rechargeable electrochemical cell may have a relatively large cycle life in comparison to an otherwise equivalent electrochemical cell lacking the separator and/or lacking the precursor for the separator. The cycle life of the rechargeable electrochemical cell may be greater than or equal to 20% larger than an otherwise equivalent electrochemical cell, greater than or equal to 50% larger than an otherwise equivalent electrochemical cell, greater than or equal to 100% larger than an otherwise equivalent electrochemical cell, greater than or equal to 200% larger than an otherwise equivalent electrochemical cell, greater than or equal to 500% larger than an otherwise equivalent electrochemical cell, or greater than or equal to 1000% larger than an otherwise equivalent electrochemical cell. The cycle life of the rechargeable electrochemical cell may be less than or equal to 2000% larger than an otherwise equivalent electrochemical cell, less than or equal to 1000% larger than an otherwise equivalent electrochemical cell, less than or equal to 500% larger than an otherwise equivalent electrochemical cell, less than or equal to 200% larger than an otherwise equivalent electrochemical cell, less than or equal to 100% larger than an otherwise equivalent electrochemical cell, or less than or equal to 50% larger than an otherwise equivalent electrochemical cell. Combinations of the above-referenced ranges are also possible (e.g., greater than or equal to 20% and less than or equal to 2000% larger than an otherwise equivalent electrochemical cell). Other ranges are also possible.

Example 1

In the example, a combined experimental/computational investigation is described to investigate electrochemical formation of lithium halide based solid electrolytes, with the goal of enabling and demonstrating self-assembling/self-healing batteries using lithium metal negative electrodes. The halogen series (I, Br, Cl and F) exhibits progressively higher reaction potentials with lithium metal. The absolute values of these potentials allow controlled formation of lithium halides (or other alkali halides) at cell potentials that are compatible with a broad range of electrochemical couples, including lithium-sulfur and lithium-intercalation cathode couples. For example, in the Li—S example referenced above, LiI has a formation potential (2.85V) higher than the Li—S reaction (2.5V), corresponding to a more negative free energy of formation, hence it is expected that the SEI on the lithium metal will contain LiI. In a hypothetical example where Li metal anode were to be used with LiFePO$_4$ cathode at cell voltage ~3.45V, LiI solid electrolyte would not spontaneously form, but other halides such as LiBr, LiCl and LiF would. It is believed that mixed halides Li(I,Br,Cl,F) compositions, including graded solid electrolytes, can be produced by appropriate control of the reaction pathway. Each of these metal halides preferentially crystallize in the rocksalt structure, which is further amenable to compositional tuning of its transport properties. For example, supervalent cation doping, e.g., with alkaline earth iodides, can produce charge-compensating cation vacancies in the rocksalt lattice that enhance lithium ion conductivity. Strategies for doping of the self-assembling lithium halide solid electrolytes can be evaluated through combined computation and experiment.

Self-healing functionality can be introduced by tuning the metal halide and the liquid electrolyte compositions to provide limited solubility of the halide in the liquid electrolyte. Lithium metal that is exposed during battery cycling, for instance through cracking of the solid electrolyte film, may be able to be passivated upon exposure to the liquid. The solubility of lithium halides in nonaqueous solvents varies, from high solubilities in ethereal solvents to low solubility in other solvents. The wide range of formation potentials suggests that the choice of solvent and halogen allows a wide range of tuning to accomplish partial solubility. This area is especially amenable to thermodynamics-based computational search in order to guide experiments.

Figure 6:
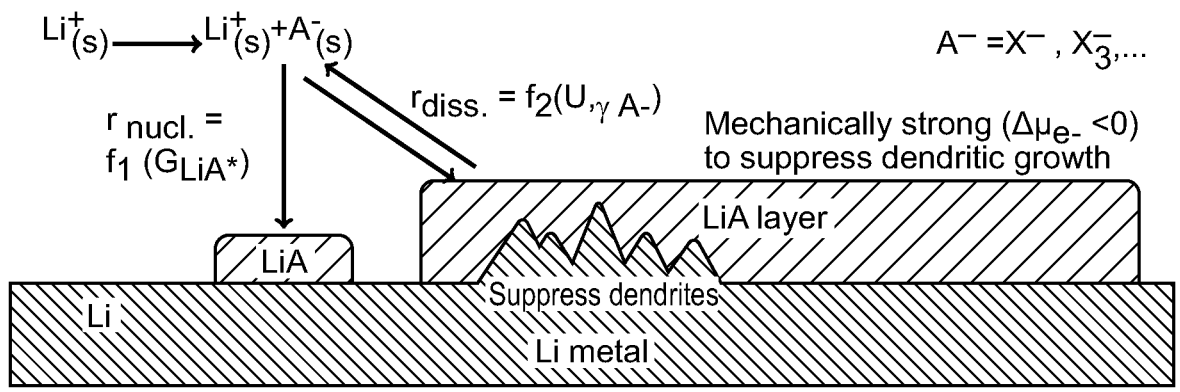
FIG. 6 shows a method for forming a lithium halide layer, in accordance with some embodiments.

This example investigates the controlled electrochemical formation of lithium-halide based solid electrolytes, with the goal of enabling and demonstrating self-assembling/self-healing batteries using lithium metal negative electrodes (see FIG. 6). The relevant performance features for a solid electrolyte compatible with lithium metal electrodes are as follows:

1. High ionic conductivity of the order of ~$10^{-2}$ S/cm
2. Electrochemically stable up to operating potentials of 4-5 V
3. High electronic conductivity, typically a material with band gap larger than 4 eV
4. Mechanically strong to suppress dendritic growth, with a shear modulus >20 GPa
5. Thermally stable with a small linear coefficient of thermal expansion, $\alpha$<0.0000105
6. High degree of selectivity (e.g., single-ion conductor)
7. Low processing cost
8. Ease of integration into existing battery designs It should be noted that solid electrolytes may have any of these features, all of these features, or none of these features.

Figure 7:
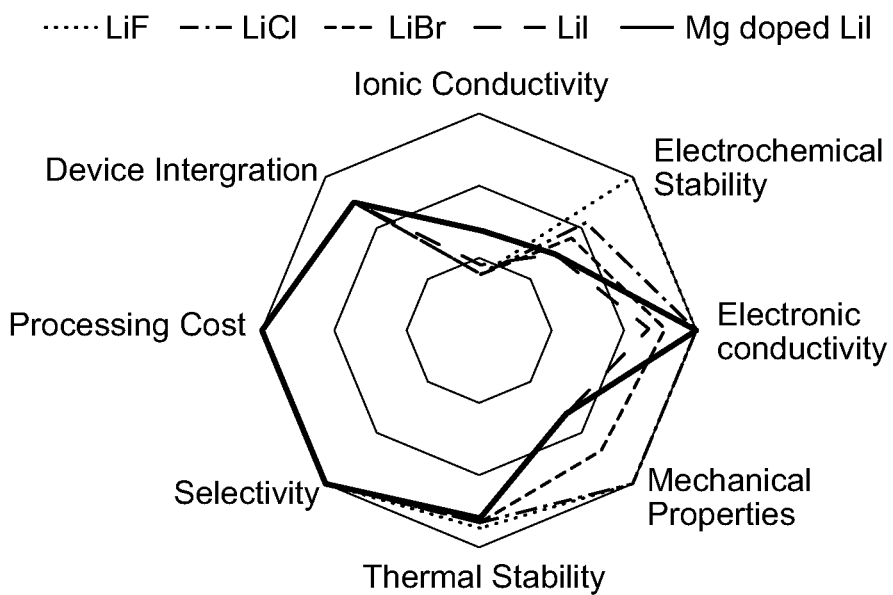
FIG. 7 is a plot showing various properties of various lithium halide salts, in accordance with some embodiments.

Using these metrics, the radar chart derived from certain lithium halide salts is presented in FIG. 7. It can be seen that for the case of pure halides, all the metrics are satisfied reasonably well except for ionic conductivity. However, the ionic conductivity is also reasonable for the doped LiI case.

In this experiment, the ionic conductivity may be improved by controlling the composition, including doping, of the in-situ formed solid halide electrolyte film. With respect to mechanical properties, the halides are high modulus inorganic solids with the ability to prevent Li dendrite penetration, as illustrated in FIG. 6. However, these compounds may have a low fracture toughness. It may be possible to overcome this limitation by developing systems that are self-healing, such that exposure of Li metal that occurs during lithium metal stripping and deposition may be spontaneously and controllably passivated by new metal halide.

Figure 8:
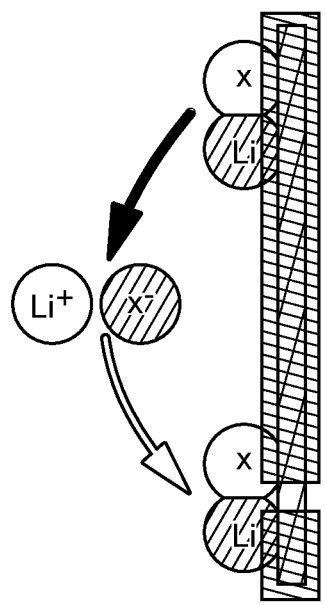
FIG. 8 shows self-healing in separators, according to some embodiments.
Figure 9:
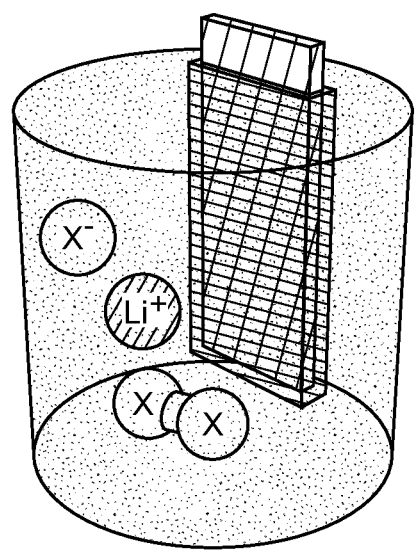
FIG. 9 shows a method for forming a passivation layer on an electrode, according to some embodiments.

The ability to repair damage spontaneously, by, e.g., self-healing, may be desirable for rechargeable batteries because electrochemical reactions in battery materials may result in structural changes (see FIG. 8). These changes may cause degradation and damage and/or ultimately cause the battery to become non-functional with cycling. Applying self-healing halides-based chemistry to lithium metal electrodes to increase their cycle-life and safety, and to reduce dendritic formation. This may be accomplished by one or more of the following strategies:

1. Initial Passivation by Chemical Means: There are numerous ways of forming an initial halide layer on Li metal, amongst the simplest of which may be dipping in a nonaqueous solvent containing a high concentration of $Li^+$ and $X^-$ ions. Other methods include exposure to halogen vapor is another method, and deposition of a poly-2-vinylpyridine film followed by reaction with $I_2$ (see FIG. 9)

2. Electrochemical Control of Solid Halide Composition: At the initially passivated surface, Li(X,Y) halides may then be deposited via control of the applied potential and speciation of the halides species in solution. All components are additives may be in the liquid electrolyte and the formation process may be carried out on the assembled cell. As shown above, deposition of the metal halides occurs with increasing potential in the order I, Br, Cl and F. Thus a thermodynamics-based chronopotentiometric profile and the dissolved halides composition may work together to determine the composition of the solid halide film. Electrochemical deposition mediated by another halogen ion in the solution may also be effective for the formation of conformal coatings of halides. For example, an LiCl layer can be mediated by a $Br^-$ ion present in the solution phase.

The scheme may proceeds in the following sequence of steps:

$X_2+Y^-\rightarrow X_2Y^-$      a. Formation of a Mixed Halide Anion:

$Li\rightarrow Li^++e^-$      b. Anodic Reaction:

$2Li^++X_2Y^-+2e^-\rightarrow 2LiX+Y^-$      c. Cathodic Reaction:

In the above scheme, the formation of LiX may be mediated by $Y^-$ ions. Note that the anode need not be lithium metal but could also be any other material that oxidation releases $Li^+$ ions in solution; for example, the halide solid electrolyte could also be deposited on a cathode.

3. Controlling Solubility of Halides for Self-Healing: The formation potentials of all the halides are large enough that exposed Li metal may be spontaneously passivated by at least a monolayer of LiX. If the LiX is completely insoluble in the electrolyte, then a substantial fraction or all X in solution may eventually be irreversibly "gettered" by exposed Li metal, and the ability of the solid iodide to passivate newly exposed Li metal against dendrite formation may eventually cease. Thus providing a persistent source of dissolved halides for self-healing of defects formed in a halide solid electrolyte during battery cycling may be advantageous. Given the wide range of formation potential for the halides, and the known large variation in LiI solubility amongst nonaqueous solvents, a wide "window" for tuning halide solubility in the electrolyte exists. Qualitatively, the solubility of LiX in any solvent will decrease in the order X=I, Br, Cl, F. In this part of the project, computations to calculate the dissolution free energy based on the adsorption energy, donor number and acceptor number of the electrolyte may guide experimental designs to systematically map the solubility of halides as a function of solvent type, such as alkyl carbonate solvents. Combined with experimental characterization of the LiX layer that forms on the Li metal and the concentration and speciation of halide in the electrolyte, it may be possible to map the partitioning of halide between the solid electrolyte layer and the equilibrium solubility in the electrolyte. A suitable thermodynamic description is that adsorption of halide species from liquid solution at sites of high Li activity may occur, and it may be beneficial to maintain an adequate source of halides in the liquid for self-healing and/or to control the composition and structure of the adsorbed layers that form on lithium metal.

The stability of the passivated Li metal surface against dendrite formation may be determined for relevant electrokinetic parameters such as the current density and thickness/capacity of lithium metal that is reversibly plated. It may be desirable to suppress dendrite formation at area capacities of 3 to 10 $mAh/cm^2$, corresponding to Li metal thickness of 15 to 50 μm.

It is recognized that the following technical barriers may be encountered:

1. Obtaining high ionic conductivity: Pure halides may have a relatively low ionic conductivity. Preliminary computational results indicate that alkaline earth doping, such as with $Mg^{2+}$, may increase the ionic conductivity of the halide salt.

2. Selective formation of solid electrolyte at the lithium interface: Tuning the solvent and salt anion chemistry such that the desired solution species and solid electrolyte film can be selectively formed.

3. Mitigating dendrite growth: Pure and mixed halides both show promising mechanical properties for the suppression of dendrite growth. Achieving selectivity in electrolyte film growth will allow the thickness and mechanical properties to be tuned for prevention of dendrites.

Figure 10:
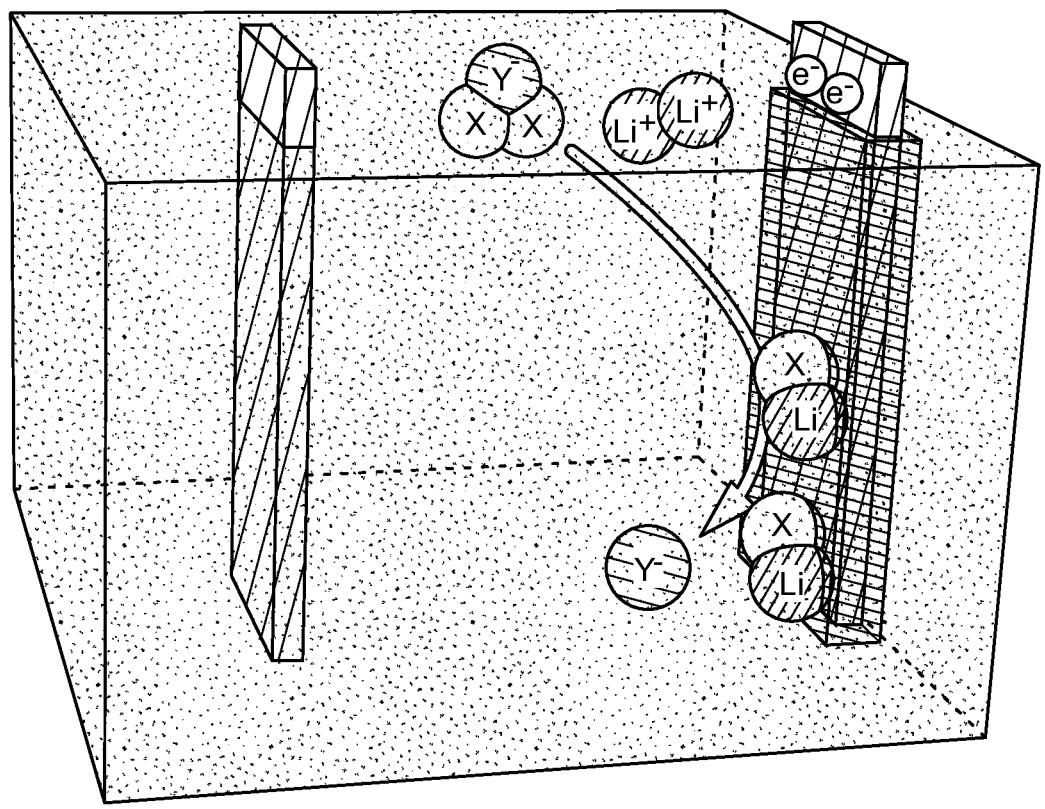
FIG. 10 shows a method for forming a separator, according to some embodiments.

4. Achieving self-healing response (see FIG. 10): Defects in the solid halide electrolyte film may spontaneously passivate with new solid electrolyte rapidly enough to prevent preferential deposition of new Li metal leading to dendrite formation.

Figure 11:
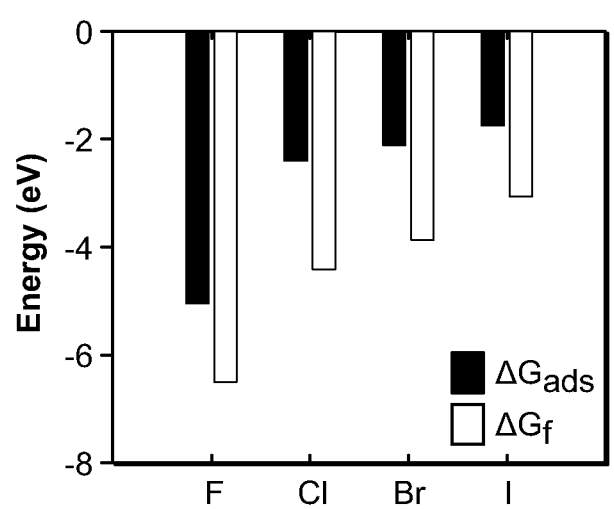
FIG. 11 shows calculated values of adsorption and formation energy for lithium halide salts, according to some embodiments.

Multiple aspects including nucleation of lithium halides, stability and growth on lithium metal, and the mechanical strength have been investigated in order to confirm the feasibility of lithium halides as stable solid electrolytes. Since adsorption energies of halides on lithium metal determine the operating-potential range for the nucleation of halides, obtaining adsorption energies of halides using Density Functional Theory (DFT) may provide relevant insight. Adsorption energies are calculated by running DFT simulations with halides as adsorbed molecules on a four-atom-thick lithium slab. Three configurations—on top, bridge and hollow positions—are simulated and the lowest energy configuration is used for calculating the adsorption energy. The adsorption energies are obtained as the formation energies of the adsorbed states, for which the energy of the lithium slab alone is obtained from DFT beforehand. FIG. 11 shows the adsorption and formation energies of the LiF, LiCl, LiBr, LiI. For the case of poly halides and mixed halides, the adsorbed molecule is simulated similarly by replacing it with a molecule of the respective mixed/poly halide.

Solid electrolytes have the potential to significantly improving the safety and energy density of batteries. Solid electrolytes with suitable mechanical properties may suppress the growth of dendrites on lithium metal anodes, whose use can greatly enhance the energy density of the battery. Both of these perspectives call for carefully studying the mechanical properties of solid electrolytes.

Using DFT, the following formalism is used to calculate the elastic moduli and mechanical properties of lithium and mixed halides. The general stress-strain constitutive relation for anisotropic materials is used, wherein the stress is related to strain by an elastic 6×6 tensor. Using density functional theory calculations of the strained halide structures, the stress is calculated at a series of applied strains. The stresses and strains are then fitted to the general stress-strain relationship, and the components of the elastic tensor are recovered from the fitting parameters. Table 1, below, shows elastic moduli of lithium halides calculated using density functional theory.

TABLE 1

| Halide | $C_{11}$ (GPa) | $C_{21}$ (GPa) | $C_{44}$ (GPa) | B (GPa) | G (GPa) |
|---|---|---|---|---|---|
| LiF | 175.87 | 57.99 | 66.12 | 97.28 | 70.57 |
| LiCl | 71.13 | 27.79 | 29.81 | 42.24 | 28.96 |
| LiBr | 56.29 | 22.61 | 23.29 | 33.83 | 22.57 |
| LiI | 46.13 | 17.39 | 18.12 | 26.97 | 18.33 |
| Li$_4$I$_3$Br | 47.72 | 18.36 | 18.76 | 28.14 | 18.86 |
| Li$_4$Br$_3$I | 53.05 | 20.69 | 21.09 | 31.47 | 21.01 |
| Li$_4$Br$_3$Cl | 59.25 | 23.42 | 24.48 | 35.37 | 23.86 |
| Li$_4$Cl$_3$Br | 66.57 | 26.24 | 27.57 | 39.69 | 26.86 |

As a criterion to investigate the feasibility of halides for the suppression of dendrites the deformation chemical potential is employed. The modified Butler-Volmer model with interfacial deformation is used:

$$i = i_{0,ref} \exp\left[\frac{(1-\alpha_a)\Delta\mu_{e^-}}{RT}\right]\left[\exp\left(\frac{\alpha_a F\eta_s}{RT}\right)\right] - \left[\exp\left(-\frac{\alpha_c F\eta_s}{RT}\right)\right]$$

Based on the response of the electrode-electrolyte interface to a periodic displacement $u(x_1, 0) = A\cos\omega x_1$ along the interface, the deformation and compressive forces experienced by the electrolyte surface will be calculated. This will help determine the value of optimal range of mechanical properties required to suppress dendrite growth.

The schemes mentioned in the section on relevance and outcomes provide a neat solution of forming a single component SEI layer on the electrode. However, owing to the complex nature of polyhalide chemistry, it may be beneficial to control the potential and concentration of the species in the electrolyte precisely so that only the desired lithium halide (LiX) is formed. Depending on the concentration of X$^-$ and dissolved X$_2$/Y$_2$ it is possible to form multiple ionic species such as X$_-$, X$_3^-$, XY$_2^-$, and XY$^{-2}$ Thus, it may be beneficial to consider the equilibrium for the following reactions in various solvents:

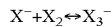

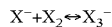

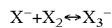

It may also be beneficial to consider the formation of the following complex ionic species through the electrochemical pathways shown below:

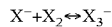

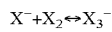

Figure 12:
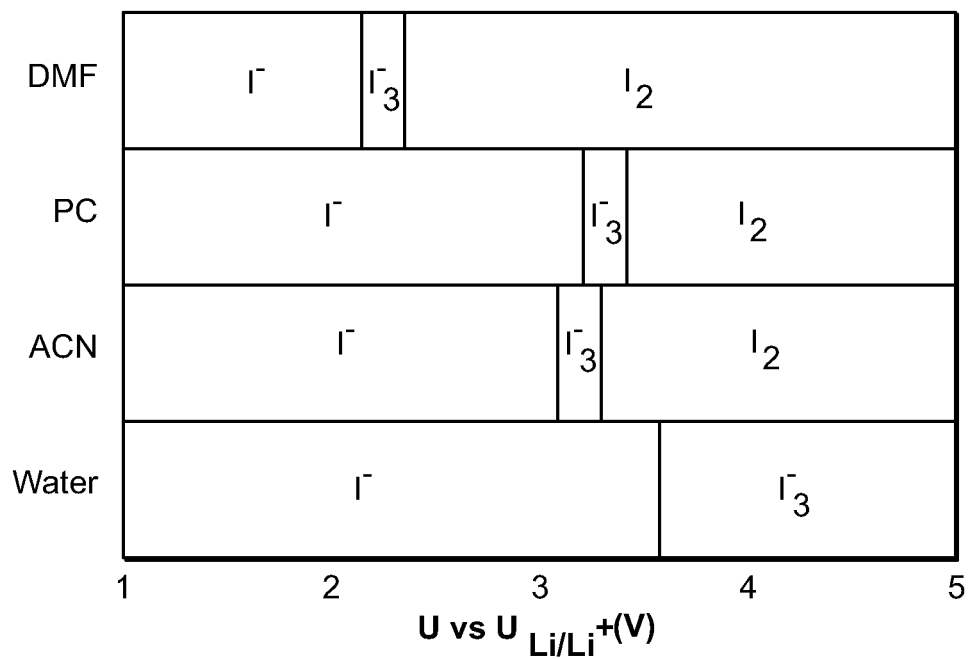
FIG. 12 shows a solution phase diagram for $I^-/I_2/I_3^-$, according to some embodiments.

The formation of even larger polyhalide complexes is also possible but may require large cations for stabilization. Considering that Li$^+$ is a very small cation, the existence of complexes with more than 3 halide atoms is improbable. Using the potentials for the above electrochemical reactions, it may be possible to develop a solution phase diagram of halide species at different potentials. An example of such a solution phase diagram for I$^-$/I$_2$/I$_3^-$ in different solvents is shown in FIG. 12.

Another aspect to consider for enabling the self-healing function is partial dissolution of LiX in the electrolyte. The dissolution reaction is given by:

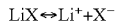

The free energy change associated with this reaction is $\Delta G_{diss} = G_{Li^+} + G_{X^-} - G_{LiX}$ where $G_{Li^+}$ depends on the Gutmann donor number of the solvent and the concentration of Li$^+$, $G_{X^-}$ depends on the Gutmann acceptor number of the solvent and the concentration of X$^-$ and $G_{LiX}$ is calculated from Density Functional Theory (DFT) calculations. For the purpose of forming a stable SEI, it may be desirable to minimize the dissolution reaction and for enabling the self-healing reaction, it may be desirable to have partial dissolution. This may be possible by making $\Delta G_{diss} \sim 0$ by choosing the appropriate lithium halide and electrolyte combination.

Figure 13A:
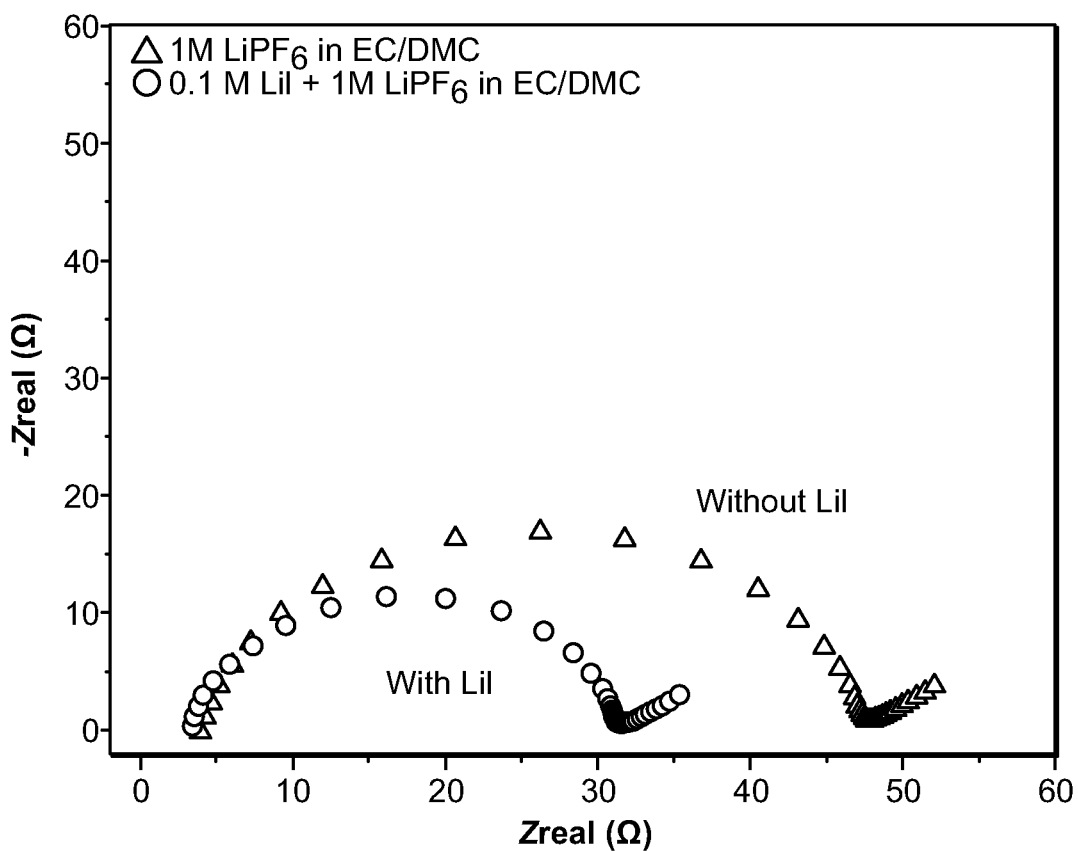
FIGS. 13A-C show the measured impedance for various electrochemical cells, according to some embodiments.
Figure 13B:
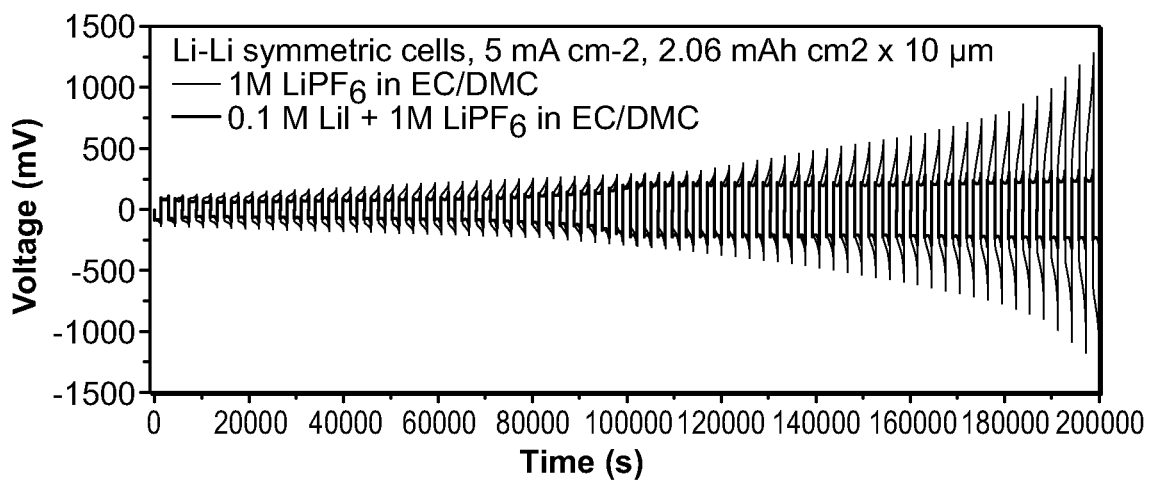
Figure 13C:
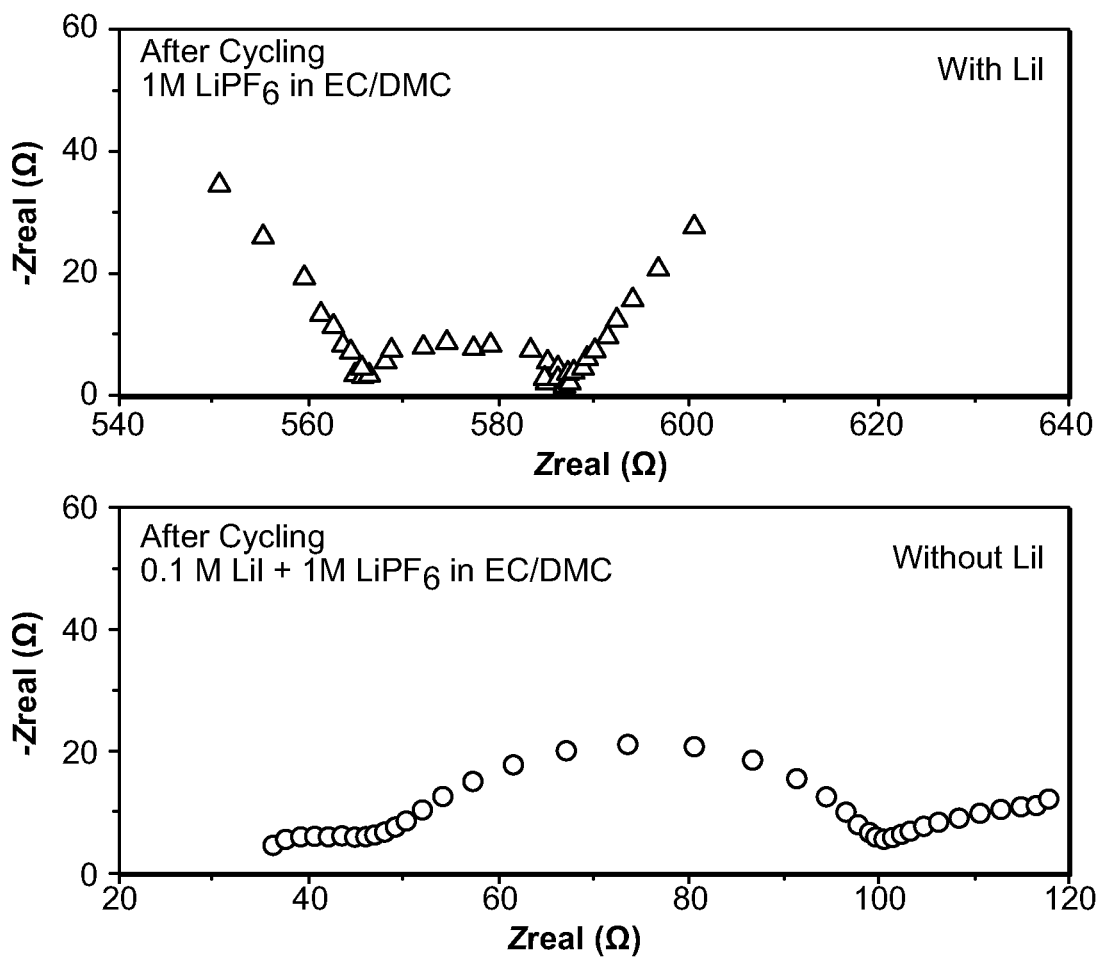

Preliminary results are shown in FIGS. 13A-C. Here, symmetric Li—Li cells have been subjected to cycling at 5 mA/cm$^2$ current density that reversibly strips and plates 10 μm of Li metal (2.05 mAh/cm$^2$). The two Li electrodes are separated by a Whatman glass fiber mat, and the electrolyte is 1M LiPF$_6$ in EC:DMC (1:1), with and without 0.1 M addition of LiI. Upon cycling, it was observed that the cells with LiI additive consistently showed both a lower initial impedance (FIG. 13A) as well as a lower impedance growth rate (FIG. 13B) than the cells without LiI. After about 70 cycles, the cells without LiI are exhibiting runaway impedance growth, whereas the cells with LiI are still cycling stably. EIS conducted after 70 cycles (FIG. 13C) shows a low frequency arc of much higher impedance in the case without LiI additive. These results are consistent with the rapid formation of an LiI-based solid electrolyte film of low resistance on the Li metal electrode, which then remains stable through extensive cycling. These results suggest improved stability of the Li electrode upon using LiI and that there may be much room for discovery upon using the proposed mixed LiX halides.

Figure 14A:
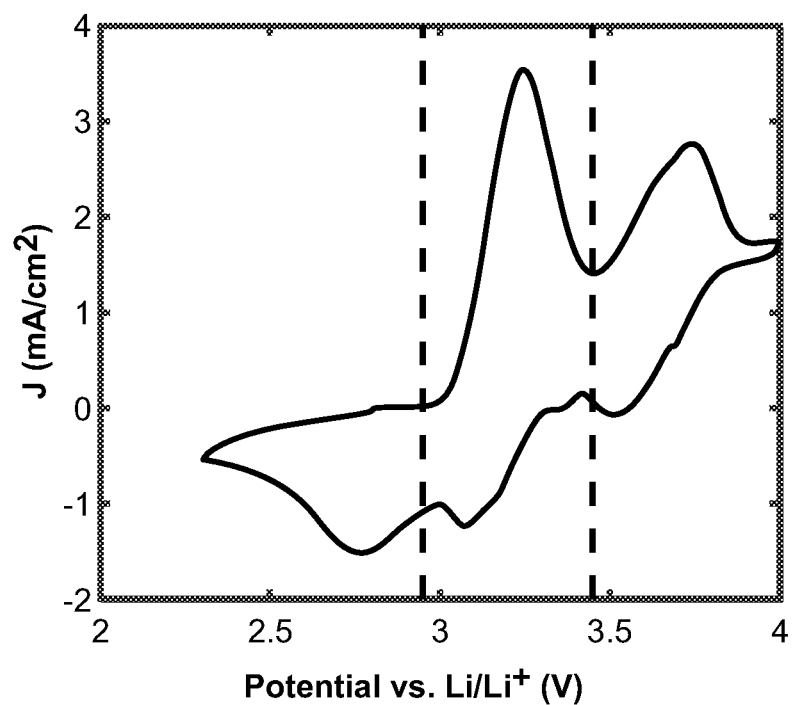
FIGS. 14A-D show cyclic voltammetry measurements performed on various electrochemical cells, according to some embodiments.
Figure 14B:
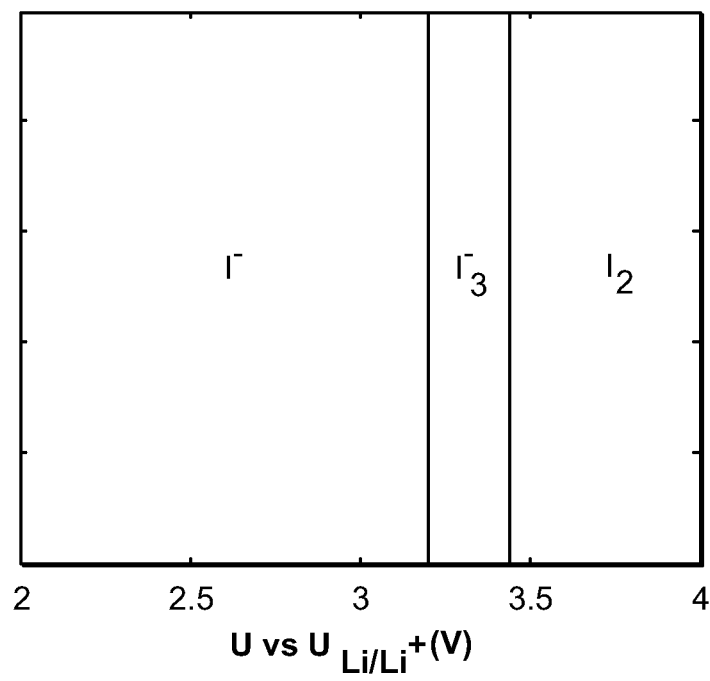
Figure 14C:
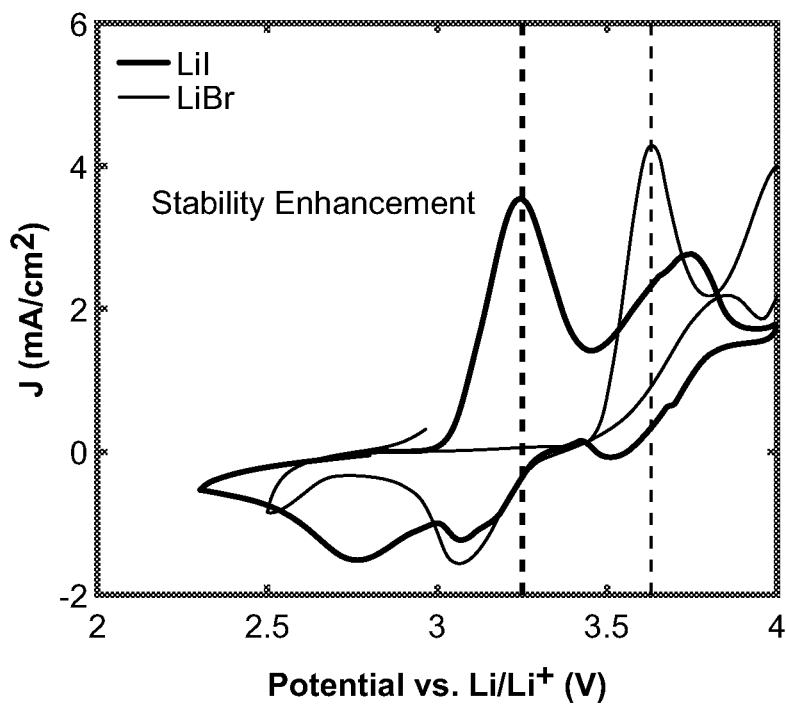
Figure 14D:
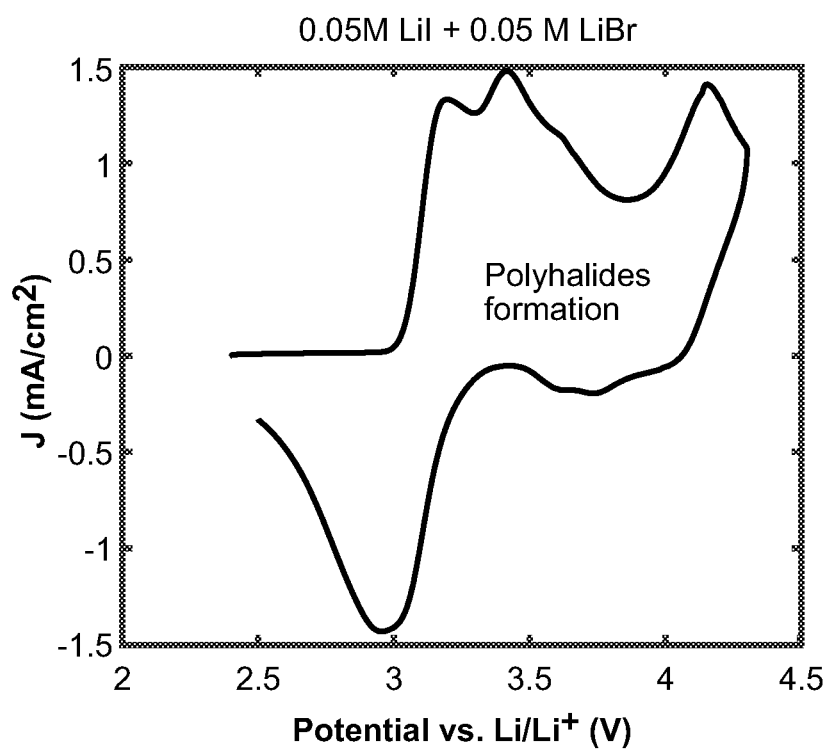

In order to discern the halide and polyhalide species under operating conditions, two-electrode measurements using carbon paper as the working electrode, Li metal as the counter/quasi-reference electrode were carried out at a scan rate of 5 mV/s. Based on the anodic scan data, it is seen that the relevant species are LiI, LiI$_3$, and I$_2$ (FIG. 14A). This is in good agreement with theoretical analysis for the dominant species shown in FIG. 14B. In order to show the effect of halide in tuning the dissolution potential, the comparison between LiI and LiBr in shown in FIG. 14C. In this case, there is a positive shift of the oxidation potential for the halide anions. In order to demonstrate the possibility for the formation of polyhalide species as discussed above, the cyclic voltammetry profile of the cell containing mixed halide (0.5 M LiI and LiBr) is shown in FIG. 14D and it is seen that speciation may be different from those of LiI-containing or LiBr containing cells. These suggest the formation of mixed polyhalide species and based on this data, it is believed that there may be evidence that the proposed self-forming and self-healing halide-based scheme is viable.

The results presented so far for the lithium halides scheme show that it can potentially solve the dendrite growth problem. To summarize, the proposed lithium halides scheme may have one or more advantages:

1. The self-forming process to make the protected electrode may be simple and scalable.
2. The mixed halide based formation process may be a step towards enabling three dimensional electrodes, which can enable very high energy density owing to a much higher surface area in comparison to the two dimensional electrodes.

3. The self-formed protected lithium electrode may not suffer from the issues faced by other additive approaches.

4. The self-healing function may be a unique aspect for the proposed scheme that has not been successfully and reliably demonstrated earlier.

Computational research may be used to compute the thermodynamics of polyhalide speciation to determine the stability range for these various polyhalide species under the operating potential. Polyhalides have complex chemistry and can form $X^-$, $X_3^-$, $X_5^-$, $X_7^-$, $X_4^{2-}$, etc and the free energies may be calculated using first-principles density functional theory calculations within an implicit solvation framework. The thermodynamics of polyhalides may change depending on the solvent. This analysis may provide an understanding of the active polyhalide species that will enable the self-assembling and self-healing processes and may be supplemented by half-cell and full cell testing.

Experimentally, the proposed self-assembling, self-limiting solid electrolytes may initially be formed on lithium metal via metal halide additives to liquid electrolytes. A variety of two-electrode and three-electrode cell constructions may be used to systematically isolate and interrogate formation of solid halide films on lithium metal. Cell designs may include "half-cells" having a lithium working electrode and nonreactive metal counter-electrode, symmetric lithium-lithium cells, and "full cells" including Li—S and Li-intercalation cathode cells. Based on laboratory cell testing, down-selects may be performed and prototype full cells of >10 mAh capacity will be fabricated and delivered to DOE-specified laboratories for testing and evaluation.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Any terms as used herein related to shape, orientation, alignment, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described. As another example, two or more fabricated articles that would described herein as being "aligned" would not require such articles to have faces or sides that are perfectly aligned (indeed, such an article can only exist as a mathematical abstraction), but rather, the arrangement of such articles should be interpreted as approximating "aligned," as defined mathematically, to an extent typically achievable and achieved for the recited fabrication technique as would be understood by those skilled in the art or as specifically described.

What is claimed is:

1. A rechargeable electrochemical cell, comprising:
a first electrode;
a second electrode;
a separator; and
an electrolyte, wherein the electrolyte comprises a salt with a concentration of greater than or equal to 0.01 M, the electrolyte having a portion of a precursor to form the separator, wherein the precursor for the separator is present in the electrolyte at a concentration of greater than or equal to 1 nM and less than or equal to 1 mM; and
wherein the precursor reacts to repair one or more defects in the separator when the first and the second electrodes reach a specific voltage between 0 V and 5 V.

2. The rechargeable electrochemical cell of claim 1, wherein the precursor for the separator is capable of healing a defect in the separator.

3. The rechargeable electrochemical cell of claim 1, wherein the precursor for the separator comprises a halide anion.

4. The rechargeable electrochemical cell as in claim 3, wherein the halide anion is one of a fluoride anion, a chloride anion, a bromide anion, or an iodide anion.

5. The rechargeable electrochemical cell of 1, wherein the precursor for the separator comprises a species that can react to form a halide anion.

6. The rechargeable electrochemical cell of claim 1, wherein the precursor for the separator comprises a polyhalide anion.

7. The rechargeable electrochemical cell of claim 6, wherein the polyhalide anion comprises at least two halogen species.

8. The rechargeable electrochemical cell of claim 1, wherein the precursor for the separator comprises a halogen with an oxidation state of 0.

9. The rechargeable electrochemical cell of claim 1, wherein the precursor for the separator comprises at least one of a chlorate anion, a perchlorate anion, a nitrate anion, a phosphate anion, a $PF_6^-$ anion, a $BF_4^-$ anion, a bis(fluorosulfonyl)imide anion, or a bis(trifluoromethane)sulfonimide anion.

10. The rechargeable electrochemical cell of claim 1, wherein the precursor for the separator comprises a lithium cation.

11. The rechargeable electrochemical cell of claim 1, wherein the precursor for the separator comprises an alkaline earth metal cation.

12. The rechargeable electrochemical cell as in claim 11, wherein the alkaline earth metal cation is $Mg^{2+}$.

13. The rechargeable electrochemical cell of claim 1, wherein the precursor for the separator comprises at least two halide anions.

14. The rechargeable electrochemical cell of claim 1, wherein the precursor for the separator does not participate in a redox shuttle when the rechargeable electrochemical cell operates at a voltage of greater than or equal to 4 V.

15. The rechargeable electrochemical cell of claim 1, wherein the precursor for the separator has a rock salt crystal structure.

16. The rechargeable electrochemical cell of claim 1, wherein the precursor for the separator has a fluorite crystal structure.

17. The rechargeable electrochemical cell of claim 1, wherein the precursor for the separator crystallizes in a R3m crystal structure.

18. The rechargeable electrochemical cell of claim 1, wherein the electrolyte comprises a solvent with one or more of an ether group, a nitrile group, a cyanoester group, a fluoroester group, a tetrazole group, a fluorosulfonyl group, a chlorosulfonyl group, a nitro group, a carbonate group, a dicarbonate group, a nitrate group, a fluoroamide group, a dione group, an azole group, or a triazine group.

19. The rechargeable electrochemical cell gas in any preceding claim 1, wherein the electrolyte comprises an alkyl carbonate solvent.

20. The rechargeable electrochemical cell of claim 1, wherein the electrolyte comprises an additive that increases the solubility of the precursor for the separator in the electrolyte.

21. The rechargeable electrochemical cell of claim 1, wherein the electrolyte includes an additive comprising one or more of a nitrile group, a fluorosulfonyl group, a chlorosulfonyl group, a nitro group, a nitrate group, a fluoroamide group, or a dione group.

22. The rechargeable electrochemical cell of claim 1, wherein an ionic conductivity of the separator is greater than or equal to $10^{-4}$ S/cm.

23. The rechargeable electrochemical cell of claim 1, wherein an area-specific impedance of the separator is less than or equal to 20 Ohm*cm2$^2$.

24. The rechargeable electrochemical cell of claim 1, wherein the separator is stable up to an operating potential of 3.7 V.

25. The rechargeable electrochemical cell of claim 1, wherein the separator has a shear modulus of greater than or equal to 5 GPa.

26. The rechargeable electrochemical cell as in any of claim 1, wherein the separator has a shear modulus of greater than or equal to 20 GPa.

27. The rechargeable electrochemical cell of claim 3, wherein the separator has a coefficient of thermal expansion of less than or equal to 0.0000105 K$^{-1}$.

28. The rechargeable electrochemical cell of claim 1, wherein the separator is a single ion conductor.

29. The rechargeable electrochemical cell of claim 1, wherein the separator is directly adjacent to the first electrode.

30. The rechargeable electrochemical cell of claim 1, wherein a thickness of the separator is greater than or equal to 1 nm and less than or equal to 50 microns.

31. The rechargeable electrochemical cell of claim 1, wherein the separator comprises at least a first layer and a second layer.

32. The rechargeable electrochemical cell of claim 31, wherein the first layer has a different composition than the second layer.

33. The rechargeable electrochemical cell of claim 31, wherein the second layer undergoes oxidation at a higher voltage than the first layer.

34. The rechargeable electrochemical cell of claim 31, wherein the first layer is closer to the first electrode than the second layer.

35. The rechargeable electrochemical cell of claim 31, wherein the separator comprises at least a third layer.

36. The rechargeable electrochemical cell of claim 1, wherein a surface of the first electrode comprises a passivation layer.

37. The rechargeable electrochemical cell of claim 36, wherein the passivation layer has a thickness of greater than or equal to 1 nm and less than or equal to 100 microns.

38. The rechargeable electrochemical cell of claim 36, wherein the passivation layer comprises a halide anion.

39. The rechargeable electrochemical cell of claim 36, wherein the passivation layer comprises poly(2-vinyl pyridine).

40. The rechargeable electrochemical cell of claim 1, wherein a thickness of the first electrode is greater than or equal to 15 microns and less than or equal to 50 microns.

41. The rechargeable electrochemical cell of claim 1, wherein the second electrode stores a working ion of the rechargeable electrochemical cell at a potential relative to a metal of the working ion that is greater than 2.0 V.

42. The rechargeable electrochemical cell of claim 1, wherein the second electrode comprises at least one of an intercalation compound, a conversion compound, an oxide, a halide, or a chalcogenide, wherein the second electrode comprises a lithium ion intercalation compound.

43. The rechargeable electrochemical cell of claim 1, wherein the second electrode comprises at least one of lithium cobalt oxide, lithium iron phosphate, lithium nickel cobalt manganese oxide, lithium nickel cobalt aluminum oxide, sulfur, or air.

44. The rechargeable electrochemical cell of claim 1, wherein the first electrode comprises lithium metal.

45. The rechargeable electrochemical cell of claim 1, wherein the first electrode comprises sodium metal.

46. The rechargeable electrochemical cell of claim 1, wherein the first electrode comprises potassium metal.

47. The rechargeable electrochemical cell of claim 1, wherein the first electrode comprises one or more of magnesium, calcium, yttrium, zinc, or aluminum.

48. The rechargeable electrochemical cell of claim 1, wherein the rechargeable electrochemical cell further comprises an ex situ separator.

49. The rechargeable electrochemical cell of claim 1, wherein the specific voltage is greater than or equal to 3 V and less than or equal to 5 V.

50. The rechargeable electrochemical cell of claim 1, wherein the rechargeable electrochemical cell is free from dendrites after greater than or equal to 50 cycles.

51. The rechargeable electrochemical cell of claim 1, wherein the rechargeable electrochemical cell has an area capacity of greater than or equal to 3 mAh/cm$^2$ and less than or equal to 10 mAh/cm$^2$.

52. The rechargeable electrochemical cell of claim 1, wherein the rechargeable electrochemical cell has a cycle life of greater than or equal to 50 cycles.

53. The rechargeable electrochemical cell of claim 1, wherein the rechargeable electrochemical cell has a cycle life of greater than or equal to 20 larger than the cycle life of an otherwise equivalent electrochemical cell lacking the precursor for the separator.

54. The rechargeable electrochemical cell of claim 1, wherein the separator is a solid electrolyte.

* * * * *